United States Patent
Slusher et al.

(10) Patent No.: US 12,508,271 B2
(45) Date of Patent: Dec. 30, 2025

(54) PRODRUGS OF 2-PMPA FOR HEALTHY TISSUE PROTECTION DURING PSMA-TARGETED CANCER IMAGING OR RADIOTHERAPY

(71) Applicants: The Johns Hopkins University, Baltimore, MD (US); Adarga, LLC, Baltimore, MD (US)

(72) Inventors: Barbara Slusher, Kingsville, MD (US); Michael Nedelcovych, Arlington, VA (US); Rana Rais, West Friendship, MD (US); Clemens Kratochwil, Hirschberg (DE)

(73) Assignees: The Johns Hopkins University, Baltimore, MD (US); Adarga, LLC, Baltimore, MD (US)

( * ) Notice: Subject to any disclaimer, the term of this patent is extended or adjusted under 35 U.S.C. 154(b) by 110 days.

(21) Appl. No.: 16/604,663

(22) PCT Filed: Apr. 11, 2018

(86) PCT No.: PCT/US2018/027106
§ 371 (c)(1),
(2) Date: Oct. 11, 2019

(87) PCT Pub. No.: WO2018/191376
PCT Pub. Date: Oct. 18, 2018

(65) Prior Publication Data
US 2020/0069706 A1    Mar. 5, 2020

Related U.S. Application Data

(60) Provisional application No. 62/484,219, filed on Apr. 11, 2017.

(51) Int. Cl.
A61K 9/00       (2006.01)
A61K 31/662   (2006.01)
(Continued)

(52) U.S. Cl.
CPC .......... *A61K 31/662* (2013.01); *A61K 31/664* (2013.01); *A61K 51/0402* (2013.01); *A61K 51/0497* (2013.01)

(58) Field of Classification Search
CPC .................................................. A61K 31/662
See application file for complete search history.

(56) References Cited

U.S. PATENT DOCUMENTS

2016/0067361 A1    3/2016    Babich et al.

FOREIGN PATENT DOCUMENTS

| WO | WO 2009/046294 | 4/2009 |
| WO | WO 2016/022809 | 6/2016 |
| WO | WO 2016/022827 | 6/2016 |

OTHER PUBLICATIONS

Afshar-Oromieh, et al., The Theranostic PSMA Ligand PSMA-617 in the Diagnosis of Prostate Cancer by PET/CT: Biodistribution in Humans, Radiation Dosimetry, and First Evaluation of Tumor Lesions. J Nucl Med. Nov. 2015;56(11):1697-705.

(Continued)

*Primary Examiner* — Paul W Dickinson
(74) *Attorney, Agent, or Firm* — Casimir Jones, SC; Jeffrey W. Childers

(57) ABSTRACT

The use of a class of prodrugs of 2-PMPA that alter tissue distribution of 2-PMPA to non-prostate tissues is disclosed. The presently disclosed prodrugs preferentially distribute to healthy tissues including the kidney, lacrimal glands, and salivary glands, which represent sites of off-target binding and toxicity for PSMA-targeted prostate cancer imaging agents and therapies. Accordingly, the 2-PMPA prodrugs can be used to pretreat, bind to, and shield the kidney and salivary glands from PSMA-targeted cytotoxic or radiotherapy.

15 Claims, 9 Drawing Sheets

(51) Int. Cl.
   *A61K 31/664* (2006.01)
   *A61K 51/04* (2006.01)

(56) References Cited

OTHER PUBLICATIONS

Akhtar, et al., Prostate-specific membrane antigen-based therapeutics. Advances in urology 2012, 973820 (2012).
Baum et al., 177Lu-Labeled Prostate-Specific Membrane Antigen Radioligand Therapy of Metastatic Castration-Resistant Prostate Cancer: Safety and Efficacy. J Nucl Med 2016;57:1006-13.
Begum, et al., The effect of total tumor volume on the biologically effective dose of tumor and kidneys for (177)Lu-labelled PSMA peptides. Journal of nuclear medicine: official publication, Society of Nuclear Medicine, (2018).
Beltran, et al., New therapies for castration-resistant prostate cancer: efficacy and safety. European urology 60, 279-290 (2011).
Benesova, et al., Preclinical Evaluation of a Tailor-Made DOTA-Conjugated PSMA Inhibitor with Optimized Linker Moiety for Imaging and Endoradiotherapy of Prostate Cancer. Journal of nuclear medicine: official publication, Society of Nuclear Medicine 56, 914-920 (2015).
Benesova, et al., Albumin-Binding PSMA Ligands: Optimization of the Tissue Distribution Profile. Mol. Pharm. 2018; 15(3):934-946.
Berge, et al., Pharmaceutical salts. J Pharm Sci. Jan. 1977;66(1):1-19.
Bodei et al., Long-term Evaluation of Renal Toxicity After Peptide Receptor Radionuclide Therapy With 90Y-DOTATOC and 177Lu-DOTATATE: The Role of Associated Risk Factors. Eur J Nucl Med Mol Imaging. Oct. 2008;35(10):1847-56.
Bouchelouche, et al., PSMA PET and Radionuclide Therapy in Prostate Cancer. Semin Nucl Med 2016; 46:522-35.
Ceci, et al., Molecular Imaging and Precision Medicine in Prostate Cancer. PET clinics 2017; 12:83-92.
Chang, et al., Overview of prostate-specific membrane antigen. Reviews in urology 6 Suppl 10, S13-18 (2004).
Chatalic et al., Towards Personalized Treatment of Prostate Cancer: PSMA I&T, a Promising Prostate-Specific Membrane Antigen-Targeted Theranostic Agent. Theranostics. Apr. 12, 2016;6(6):849-61.
De Bono, et al., Prednisone plus cabazitaxel or mitoxantrone for metastatic castration-resistant prostate cancer progressing after docetaxel treatment: a randomised open-label trial. Lancet (London, England) 376, 1147-1154 (2010).
Delker, et al., Dosimetry for (177)Lu-DKFZ-PSMA-617: A New Radiopharmaceutical for the Treatment of Metastatic Prostate Cancer. Eur J Nucl Med Mol Imaging. Jan. 2016;43(1):42-51.
Donin, et al., Why Targeting PSMA Is a Game Changer in the Management of Prostate Cancer. Journal of nuclear medicine: official publication, Society of Nuclear Medicine 59, 177-182 (2018).
Eiber, et al., Prostate-Specific Membrane Antigen Ligands for Imaging and Therapy. Journal of nuclear medicine: official publication, Society of Nuclear Medicine 58, 67s-76s (2017).
Fakhrejahani, et al., Management Options for Biochemically Recurrent Prostate Cancer. Current treatment options in oncology 18, 26 (2017).
Fendler, et al., (177)Lu-PSMA Radioligand Therapy for Prostate Cancer. Journal of nuclear medicine: official publication, Society of Nuclear Medicine 58, 1196-1200 (2017).
Fendler, et al., Preliminary experience with dosimetry, response and patient reported outcome after 177Lu-PSMA-617 therapy for metastatic castration-resistant prostate cancer. Oncotarget 2017;8(2):3581-90.
Freiberger, et al., Long-term prognostic significance of rising PSA levels following radiotherapy for localized prostate cancer—focus on overall survival. Radiation oncology (London, England) 12, 98 (2017).
Gaertner, et al., Uptake of PSMA-ligands in normal tissues is dependent on tumor load in patients with prostate cancer. Oncotarget 2017;8(33):55094-103.
Haberkorn, et al., The Future of Radioligand Therapy: alpha, beta, or Both? Journal of nuclear medicine: official publication, Society of Nuclear Medicine 58, 1017-1018 (2017).
Haberkorn, et al., New Strategies in Prostate Cancer: Prostate-Specific Membrane Antigen (PSMA) Ligands for Diagnosis and Therapy. Clin Cancer Res 2016; 22:9-15.
Halabi, et al., Updated prognostic model for predicting overall survival in first-line chemotherapy for patients with metastatic castration-resistant prostate cancer. Journal of clinical oncology: official journal of the American Society of Clinical Oncology 32, 671-677 (2014).
Han, et al., Biochemical (prostate specific antigen) recurrence probability following radical prostatectomy for clinically localized prostate cancer. The Journal of urology 169, 517-523 (2003).
Hofman, et al., Lutetium-177 PSMA (LuPSMA) theranostics phase II trial: efficacy, safety and QoL in patients with castrate-resistant prostate cancer treated with LuPSMA. Annals of Oncology 28, Suppl 5 (2017).
Hohberg, et al., Lacrimal Glands May Represent Organs at Risk for Radionuclide Therapy of Prostate Cancerwith [177Lu]DKFZ-PSMA-617. Mol Imaging Biol 2016;18:437-45.
Israeli, et al., Expression of the prostate-specific membrane antigen. Cancer research 54, 1807-1811 (1994).
Kabasakal, et al., Pre-therapeutic dosimetry of normal organs and tissues of (177)Lu-PSMA-617 prostate-specific membrane antigen (PSMA) inhibitor in patients with castration-resistant prostate cancer. European journal of nuclear medicine and molecular imaging 42, 1976-1983 (2015).
Kabasakal, et al., Lu-177-PSMA-617 Prostate-Specific Membrane Antigen Inhibitor Therapy in Patients with Castration-Resistant Prostate Cancer: Stability, Bio-distribution and Dosimetry. Molecular imaging and radionuclide therapy 26, 62-68 (2017).
Kantoff, et al., Sipuleucel-T immunotherapy for castration-resistant prostate cancer. The New England journal of medicine 363, 411-422 (2010).
Kasperzyk, et al., Prostate-specific membrane antigen protein expression in tumor tissue and risk of lethal prostate cancer. Cancer Epidemiol Biomarkers Prev 2013; 22:2354-63.
Kiess, et al., (2S)-2-(3-(1-Carboxy-5-(4-211At-Astatobenzamido)Pentyl)Ureido)-Pentanedioic Acid for PSMA-Targeted alpha-Particle Radiopharmaceutical Therapy. Journal of nuclear medicine: official publication, Society of Nuclear Medicine 57, 1569-1575 (2016).
Klein, et al., Physiologic distribution of PSMA-ligand in salivary glands and seromucous glands of the head and neck on PET/CT. Oral surgery, oral medicine, oral pathology and oral radiology, (2018).
Kopka, et al., Glu-Ureido-Based Inhibitors of Prostate-Specific Membrane Antigen: Lessons Learned During the Development of a Novel Class of Low-Molecular-Weight Theranostic Radiotracers. Journal of nuclear medicine: official publication, Society of Nuclear Medicine 58, 17s-26s (2017).
Kratochwil, et al., Targeted alpha-Therapy of Metastatic Castration-Resistant Prostate Cancer with (225)Ac-PSMA-617: Dosimetry Estimate and Empiric Dose Finding. Journal of nuclear medicine: official publication, Society of Nuclear Medicine 58, 1624-1631 (2017).
Kratochwil, et al., Targeted alpha therapy of mCRPC: Dosimetry estimate of (213) Bismuth-PSMA-617. European journal of nuclear medicine and molecular imaging 45, 31-37 (2018).
Kratochwil, et al., Current Status of Prostate-Specific Membrane Antigen Targeting in Nuclear Medicine: Clinical Translation of Chelator Containing Prostate-Specific Membrane Antigen Ligands Into Diagnostics and Therapy for Prostate Cancer. Semin Nucl Med 2016;46:405-18.
Kratochwil, et al., PMPA for nephroprotection in PSMA-targeted radionuclide therapy of prostate cancer. J Nucl Med 2015; 56:293-8.
Kratochwil, et al., Targeted Alpha Therapy of mCRPC with (225)Actinium-PSMA-617: Swimmer-Plot analysis suggests effi-

(56) References Cited

OTHER PUBLICATIONS cacy regarding duration of tumor-control. Journal of nuclear medicine: official publication, Society of Nuclear Medicine, (2018).
Kratochwil, et al., PSMA-Targeted Radionuclide Therapy of Metastatic Castration-Resistant Prostate Cancer with 177Lu-Labeled PSMA-617. Journal of nuclear medicine: official publication, Society of Nuclear Medicine 57, 1170-1176 (2016).
Kwekkeboom, et al., Perspective on 177Lu-PSMA Therapy for Metastatic Castration-Resistant Prostate Cancer. Journal of nuclear medicine: official publication, Society of Nuclear Medicine 57, 1002-1003 (2016).
Liu, et al., Constitutive and Antibody-induced Internalization of Prostate-specific Membrane Antigen. Cancer Res. Sep. 15, 1998;58(18):4055-60.
Lutje, et al., PSMA Ligands for Radionuclide Imaging and Therapy of Prostate Cancer: Clinical Status. Theranostics 5, 1388-1401 (2015).
Majer, et al., Discovery of Orally Available Prodrugs of the Glutamate Carboxypeptidase II (GCPII) Inhibitor 2-Phosphonomethylpentanedioic Acid (2-PMPA). J Med Chem 2016; 59:2810-9.
Maurer, et al., Current use of PSMA-PET in prostate cancer management. Nature reviews Urology 2016; 13:226-35.
Moreira, et al., Predicting Time From Metastasis to Overall Survival in Castration-Resistant Prostate Cancer: Results from Search. Clinical genitourinary cancer 15, 60-66.e62 (2017).
Morris, et al., Radiographic progression-free survival as a response biomarker in metastatic castration-resistant prostate cancer: COU-AA-302 results. Journal of clinical oncology: official journal of the American Society of Clinical Oncology 33, 1356-1363 (2015).
Nedelcovych, et al., Enhanced Brain Delivery of 2-(Phosphonomethyl)pentanedioic Acid Following Intranasal Administration of Its gamma-Substituted Ester Prodrugs. Molecular pharmaceutics 14, 3248-3257 (2017).
O'Keefe, et al., Comparative analysis of prostate-specific membrane antigen (PSMA) versus a prostate-specific membrane antigen-like gene. The Prostate 58, 200-210 (2004).
Omlin, et al., Improved survival in a cohort of trial participants with metastatic castration-resistant prostate cancer demonstrates the need for updated prognostic nomograms. European urology 64, 300-306 (2013).
Parker, et al., Alpha emitter radium-223 and survival in metastatic prostate cancer. The New England journal of medicine 369, 213-223 (2013).
Perner, et al., Prostate-specific membrane antigen expression as a predictor of prostate cancer progression. Hum Pathol 2007; 38:696-701.
Petrylak, et al., Docetaxel and estramustine compared with mitoxantrone and prednisone for advanced refractory prostate cancer. The New England journal of medicine 351, 1513-1520 (2004).
Pillai, et al., Radiolabeled enzyme inhibitors and binding agents targeting PSMA: Effective theranostic tools for imaging and therapy of prostate cancer. Nucl Med Biol 2016; 43:692-720.
Rahbar, et al., German Multicenter Study Investigating 177Lu-PSMA-617 Radioligand Therapy in Advanced Prostate Cancer Patients. Journal of nuclear medicine: official publication, Society of Nuclear Medicine 58, 85-90 (2017).
Rahbar, et al., (177)Lu-PSMA-617 radioligand therapy in mCRPC: ready for phase III trial? European journal of nuclear medicine and molecular imaging 45, 513-514 (2018).
Ramadan, et al., Enzalutamide for patients with metastatic castration-resistant prostate cancer. OncoTargets and therapy 8, 871-876 (2015).
Ristau, et al., The prostate-specific membrane antigen: lessons and current clinical implications from 20 years of research. Urologic oncology 32, 272-279 (2014).
Saad, et al., The 2015 CUA-CUOG Guidelines for the management of castration-resistant prostate cancer (CRPC). Canadian Urological Association Journal. Journal de l'Association des urologues du Canada 9, 90-96 (2015).
Scarpa, et al., The (68)Ga/(177)Lu theragnostic concept in PSMA targeting of castration-resistant prostate cancer: correlation of SUVmax values and absorbed dose estimates. European journal of nuclear medicine and molecular imaging 44, 788-800 (2017).
Schwarzenboeck, et al., PSMA Ligands for PET Imaging of Prostate Cancer. Journal of nuclear medicine: official publication, Society of Nuclear Medicine 58, 1545-1552 (2017).
Silver, et al., Cordon-Cardo, Prostate-specific membrane antigen expression in normal and malignant human tissues. Clinical cancer research: an official journal of the American Association for Cancer Research 3, 81-85 (1997).
Taieb, et al., PSMA-Targeted Radionuclide Therapy and salivary gland toxicity: why does it matter? Journal of nuclear medicine: official publication, Society of Nuclear Medicine, (2018).
Torre, et al., Global cancer statistics, 2012. CA: a cancer journal for clinicians 65, 87-108 (2015).
Valkema, et al., Long-term follow-up of renal function after peptide receptor radiation therapy with (90)Y-DOTA(0), Tyr(3)-octreotide and (177)Lu-DOTA(0), Tyr(3)-octreotate. Journal of nuclear medicine: official publication, Society of Nuclear Medicine 46 Suppl 1, 83s-91s (2005).
Virgolini, et al., Current status of theranostics in prostate cancer. European journal of nuclear medicine and molecular imaging, (2017).
Von Eyben, et al., Third-line treatment and (177) Lu-PSMA radioligand therapy of metastatic castration-resistant prostate cancer: a systematic review. European journal of nuclear medicine and molecular imaging, (2017).
Yadav, et al., Post-therapeutic dosimetry of 177Lu-DKFZ-PSMA-617 in the treatment of patients with metastatic castration-resistant prostate cancer. Nuclear medicine communications 38, 91-98 (2017).
Yordanova, et al., The impact of repeated cycles of radioligand therapy using [177Lu]Lu-PSMA-617 on renal function in patients with hormone refractory metastatic prostate cancer. European journal of nuclear medicine and molecular imaging, (2017).
Zechmann, et al., Radiation dosimetry and first therapy results with a (124)I/(131)I-labeled small molecule (MIP-1095) targeting PSMA for prostate cancer therapy. European journal of nuclear medicine and molecular imaging 41, 1280-1292 (2014).
Zumsteg, et al., The natural history and predictors of outcome following biochemical relapse in the dose escalation era for prostate cancer patients undergoing definitive external beam radiotherapy. European urology 67, 1009-1016 (2015).
International Search Report and Written Opinion for PCT/US2018/027106, mailed Dec. 4, 2018, 15 pages.
Extended EP Search Report foR EP18783981.6, mailed Nov. 23, 2020, 13 pages.

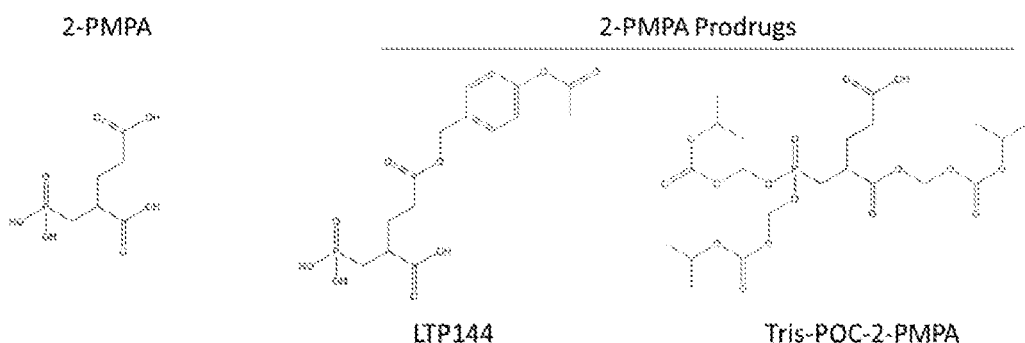
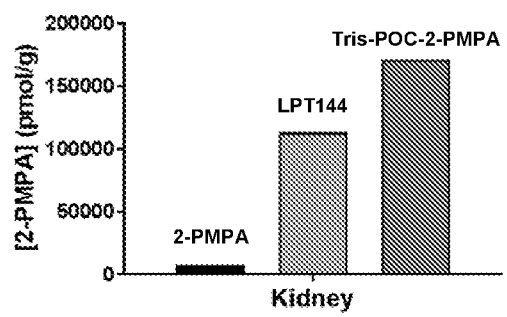
Fig. 1

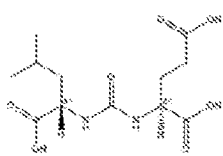
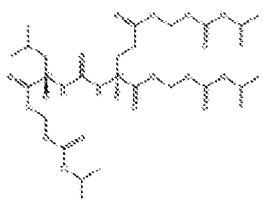
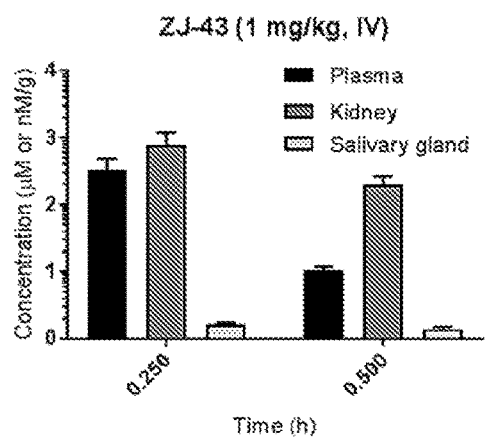
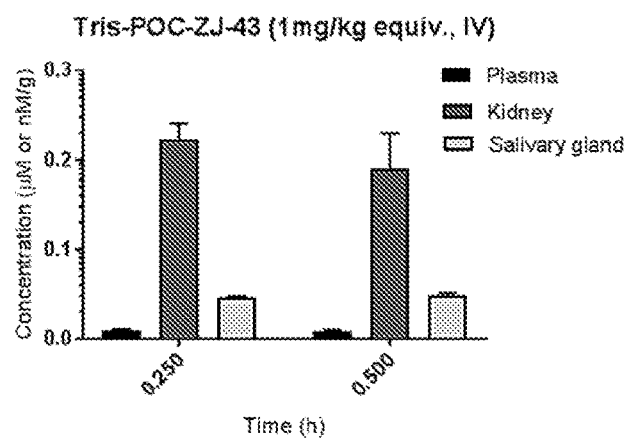
*Fig. 2A*  *Fig. 2B*

| Compound | Tissue | $C_{max}$ (nmol/g) | AUC (h*nmol/g) | Tissue:Tumor AUC Ratio |
|---|---|---|---|---|
| 2-PMPA | Plasma | 37.4 | 17.7 | 3.25 |
| | Tumor | 5.09 | 5.46 | 1.00 |
| | Kidney | 94.8 | 94.1 | 17.2 |
| | Salivary | 2.86 | 1.76 | 0.32 |
| Tris-POC-2-PMPA | Plasma | 27.7 | 15.7 | 2.41 |
| | Tumor | 2.72 | 6.51 | 1.00 |
| | Kidney | 209 | 374 | 57.5 |
| | Salivary | 4.52 | 17.5 | 3.18 |

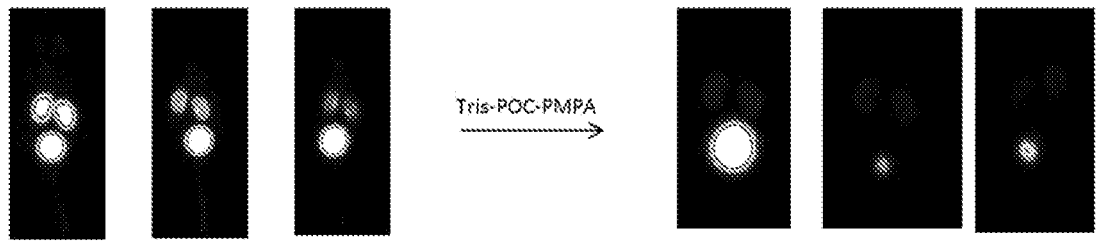
*Fig. 4A*            *Fig. 4B*
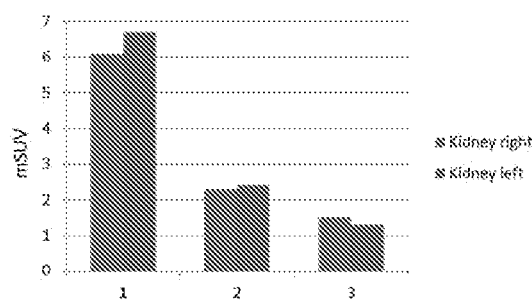 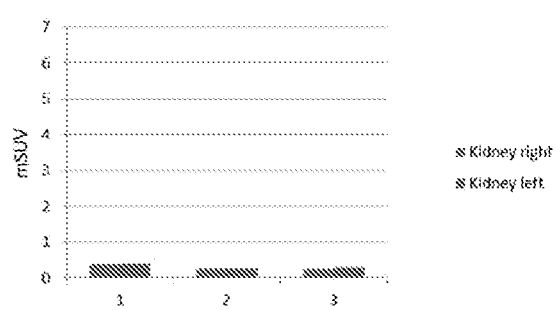
*Fig. 4C*            *Fig. 4D*

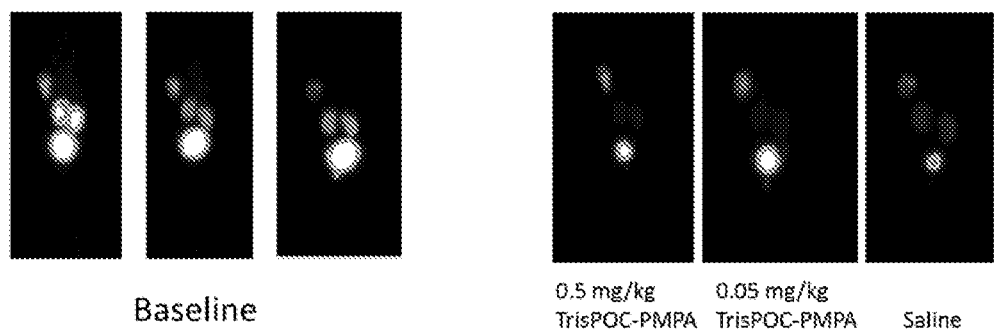
*Fig. 5A*       *Fig. 5B*
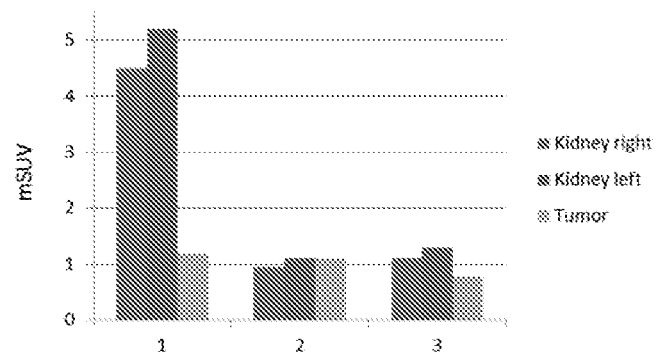
*Fig. 5C*
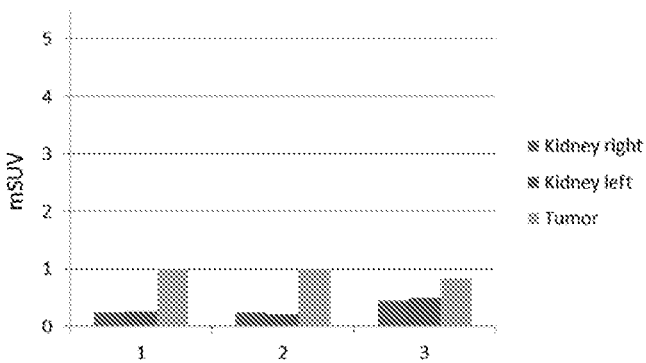
*Fig. 5D*

| Tissue/Organ | Control (SUV$_{max}$) | Tris-POC-2-PMPA (SUV$_{max}$) | % Change |
|---|---|---|---|
| Metastases (mean) | - | - | -3.2 |
| Cervical LN | 3.6 | 3.9 | 8.3 |
| Thoracic LN | 7.8 | 5.3 | -32.1 |
| Parailliacal LN | 12.5 | 8.8 | -29.6 |
| Retrocrural LN | 4.4 | 4.2 | -4.5 |
| Left Illiacal LN | 3.8 | 5.4 | 42.1 |
| Salivary (mean) | - | - | -36.7 |
| Parotid | 18.2 | 10.6 | -41.8 |
| Submandibular | 23.1 | 14.6 | -36.8 |
| Sublingual | 13.7 | 9.4 | -31.4 |
| Kidneys | 35.4 | 8.5 | -76.0 |
| Lacrimal | 16.1 | 8.9 | -44.7 |
| Blood | 1.2 | 1.7 | 41.7 |
| Liver | 4.8 | 4.7 | -2.1 |
| Spleen | 12.6 | 8.0 | -36.5 |

|  | | Tris-POC-2-PMPA | | Control (Kratochwil, 2016) |
|---|---|---|---|---|
|  | Tissue | Patient 1 | Patient 2 | Mean ± SD |
|  | Metastases | 8.03 | 13.15 | 14.6 ± 6.80 |
| Dose Limiting | Salivary (mean) | 0.37 | 0.45 | 1.44 ± 0.26 |
| | Parotid | 0.24 | 0.46 | 1.44 ± 0.52 |
| | Submandibular | 0.50 | 0.44 | 1.44 ± 0.26 |
| | Kidney | 0.38 | 0.43 | 0.78 ± 0.26 |
| Dose Limiting | Lacrimal | 0.43 | 0.82 | 3.50 ± 1.00 |
| | Red marrow | 0.05 | 0.04 | 0.03 ± 0.01 |
| | Liver | 0.05 | 0.08 | 0.10 ± 0.04 |
| | Spleen | 0.13 | 0.21 | 0.21 ± 0.08 |

PRODRUGS OF 2-PMPA FOR HEALTHY TISSUE PROTECTION DURING PSMA-TARGETED CANCER IMAGING OR RADIOTHERAPY

CROSS-REFERENCE TO RELATED APPLICATIONS

This application claims the benefit of U.S. Provisional Application No. 62/484,219 filed Apr. 11, 2017, which is incorporated herein by reference in its entirety.

FEDERALLY SPONSORED RESEARCH OR DEVELOPMENT

This invention was made with government support under R01 CA161056-01 awarded by the National Cancer Institute (NCI) of the National Institutes of Health (NIH). The government has certain rights in the invention.

BACKGROUND

Prostate cancer cells, as well as endothelial cells in the neovasculature of multiple other solid tumors, significantly overexpress prostate-specific membrane antigen (PSMA), a membrane-tethered peptidase (Kasperzyk et al., 2013). PSMA overexpression has been shown to correlate with aggressive tumors, metastatic disease, and poor prognosis in prostate cancer patients (Perner et al., 2007). Successful efforts have been mounted to target PSMA with radiolabeled or cytotoxic drug-conjugated biologic and small molecule ligands for the purposes of prostate cancer tumor imaging (Bouchelouche et al., 2016; Ceci, et al., 2017; Haberkorn, et al., 2016; Kratochwil, et al., 2016; Maurer et al., 2016) or targeted chemotherapy or radiotherapy (Bouchelouche et al., 2016; Ceci, et al., 2017; Haberkorn, et al., 2016; Kratochwil, et al., 2016; Maurer et al., 2016; and Pillai et al., 2016) with several clinical trials underway. In addition to prostate cancer and proliferating endothelial cells, however, normal tissues also express PSMA with the highest density of non-CNS expression in kidney, lacrimal glands, and salivary glands. These tissues thus represent areas of interference (for PSMA-expressing cancer imaging) or dose-limiting sites of toxicity (for PSMA-targeted cancer therapies) (Kratochwil et al., 2015).

In an attempt to mitigate healthy tissue exposure during PSMA-targeted therapies, the highly selective and well-tolerated PSMA inhibitor 2-(phosphonomethyl)pentanedioic acid (2-PMPA) has been evaluated for the ability to block radioligand uptake in the salivary glands and kidneys through direct competitive displacement at a shared PSMA binding site (Kratochwil, et al., 2015; Chatalic, et al., 2016). In one study, 2-PMPA (0.01 mg) co-injection with $^{177}$Lu-PSMA I&T (100 MBq) reduced the absorbed dose to the kidneys by 83% and attenuated nephrotoxicity 3 months later in mice bearing PSMA-expressing human cancer xenografts (Chatalic, et al., 2016). Although encouraging, these results did not prompt clinical testing because 2-PMPA also inhibited tumor uptake of the radiotherapeutic by more than 50%, resulting in accelerated tumor growth and significantly reduced overall survival relative to mice that received the radiotherapeutic alone (Chatalic, et al., 2016). Similar results were obtained when 2-PMPA was paired with $^{125}$I-MIP-1095 (Kratochwil, et al., 2015). Previously attempted mitigation strategies for the salivary glands also have failed (Taieb, et al., 2018), including co-treatment with 2-PMPA to inhibit PSMA-specific uptake (Kratochwil, et al., 2015).

These findings are consistent with preclinical pharmacokinetic data indicating little to no salivary gland penetration if 2-PMPA is administered as parent, likely owing to its high polarity and generally poor tissue penetration (Majer, et al., 2016). Thus, although 2-PMPA provided an important proof-of-concept for the shielding approach, co-treatment with this molecule could not strike a balance between salivary gland/kidney displacement and tumor uptake that would meaningfully improve the therapeutic index of PSMA-targeted therapies.

SUMMARY

In some aspects, the presently disclosed subject matter provides a method for preventing or reducing an accumulation of a prostate-specific membrane antigen (PSMA) imaging or therapeutic agent in an off-target non-cancer tissue, the method comprising administering to a subject being treated with a PSMA-targeted imaging or therapeutic agent a prodrug of 2-(phosphonomethyl)pentanedioic acid (2-PMPA) in an amount effective to prevent or reduce binding of the agent to an off-target non-cancer tissue. In contrast to 2-PMPA, the presently disclosed 2-PMPA prodrugs exhibit unexpected preferential distribution to healthy non-cancer tissues including kidneys and salivary glands, which represent sites of interference or dose-limiting toxicity for PSMA-targeted agents. In so doing, the presently disclosed methods may increase the therapeutic window of PSMA-targeted therapeutics, reduce the risk of salivary gland and kidney toxicity, and possibly enable more treatment cycles initiated earlier in disease course.

In some aspects, the prodrug of 2-PMPA comprises a compound of formula (I) or formula (II):

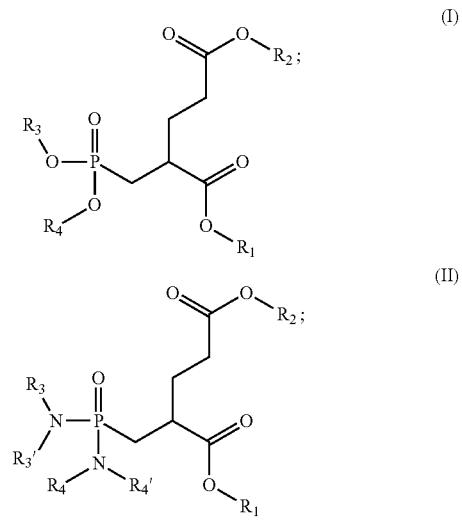

wherein: each $R_1$, $R_2$, $R_3$, and $R_4$ is independently selected from the group consisting of H, alkyl, Ar, —$(CR_5R_6)_n$—Ar, —$(CR_5R_6)_n$—O—C(=O)—$R_7$, —$(CR_5R_6)_n$—C(=O)—O—$R_7$, —$(CR_5R_6)_n$—O—C(=O)—O—$R_7$, —$(CR_5R_6)_n$—O—$R_7$, —$(CR_5R_6)_n$—O—[$(CR_5R_6)_n$—O]$_m$—$R_7$, —$(CR_5R_6)_n$—Ar—O—C(=O)—$R_7$, —Ar—C(=O)—O—$(CR_5R_6)_n$—$R_7$, —$(CR_5R_6)_n$—$NR_8R_9$, and —$(CR_5R_6)_n$—C(=O)—$NR_8R_9$; wherein: n is an integer from 1 to 20; m is an integer from 1 to 20; each $R_3'$ and $R_4'$ are independently H or alkyl; each $R_5$ and $R_6$ is independently selected from the group consisting of H, alkyl, and alkylaryl; each $R_7$ is independently straightchain or branched alkyl; Ar is aryl, substituted aryl, heteroaryl or substituted heteroaryl; and $R_8$ and $R_9$ are each independently H or alkyl; and pharmaceutically acceptable salts thereof.

In particular aspects, the compound of formula (I) is:

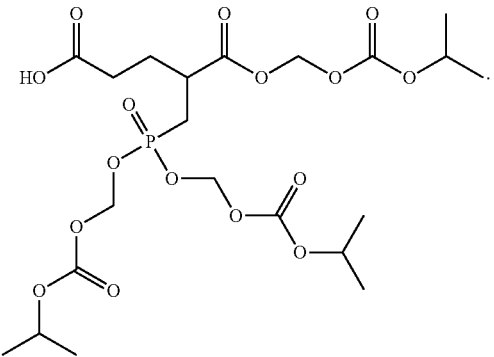 [SMILES: CC(C)OC(=O)OCOC(=O)C(CCC(=O)O)CP(=O)(OCOC(=O)OC(C)C)OCOC(=O)OC(C)C]

In other aspects, the presently disclosed subject matter provides a method for reducing salivary gland damage in a patient receiving PSMA-targeted therapy for cancer, comprising administering to the patient a therapeutically effective amount of a prodrug of 2-PMPA.

In particular aspects, the salivary gland damage gives rise to a side effect selected from the group consisting of xerostomia, thickened saliva, reduced saliva, mouth sores, hoarseness, trouble swallowing, loss of taste, and combinations thereof.

In yet other aspects, the presently disclosed subject matter provides a method for reducing kidney damage in a patient receiving PSMA-targeted therapy for cancer, comprising administering to the patient a therapeutically effective amount of a prodrug of 2-PMPA.

Certain aspects of the presently disclosed subject matter having been stated hereinabove, which are addressed in whole or in part by the presently disclosed subject matter, other aspects will become evident as the description proceeds when taken in connection with the accompanying Examples and Figures as best described herein below.

BRIEF DESCRIPTION OF THE FIGURES

Figure 3A:
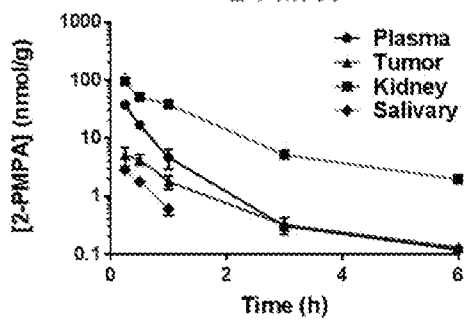
Figure 3B:
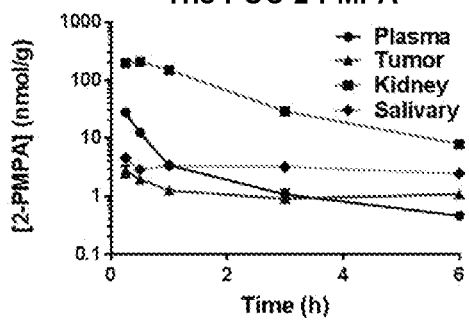
Figure 6A:
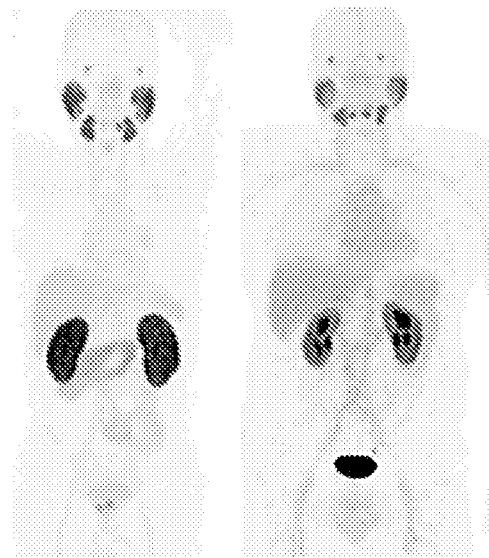
Figure 6B:
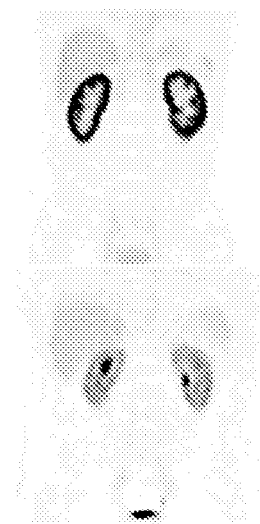
Figure 6C:
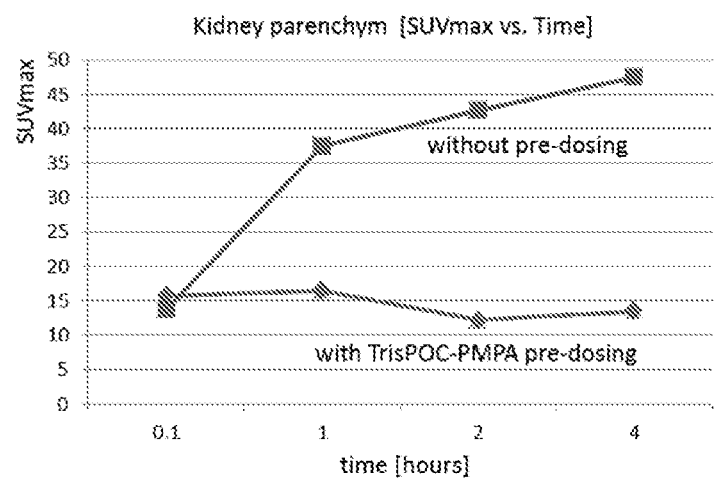
Figure 6D:
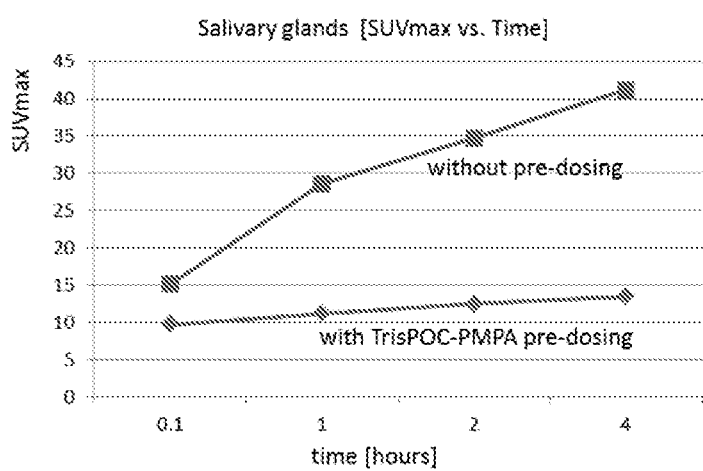
Figure 7:
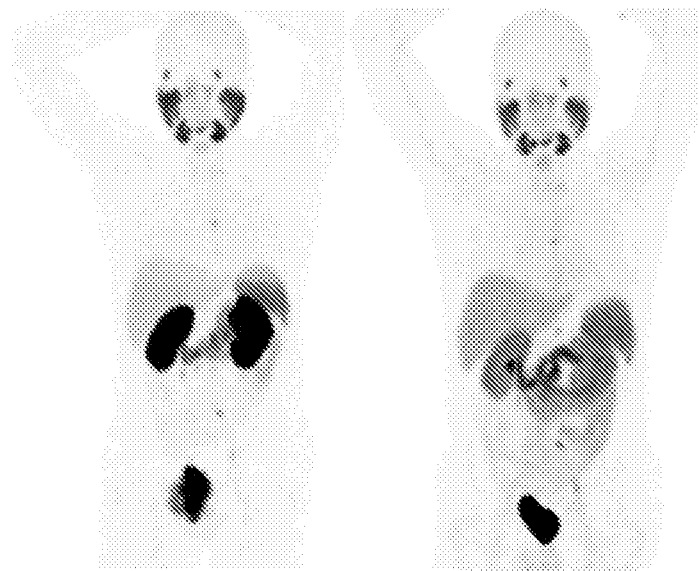
Figure 8:
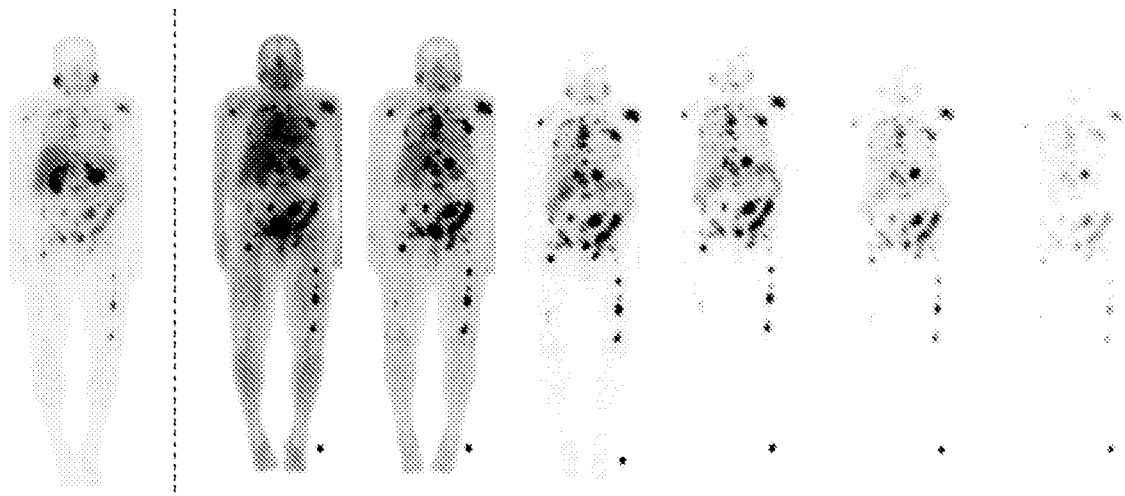

Having thus described the presently disclosed subject matter in general terms, reference will now be made to the accompanying Figures, which are not necessarily drawn to scale, and wherein:

FIG. 1 shows that Tris-POC-2-PMPA prodrug delivered significantly larger 2-PMPA concentrations to kidney of nude mice. Compared to an equimolar dose of 2-PMPA, Tris-POC-2-PMPA (5 mg/kg, i.p.) resulted in greater than 20-fold increased concentrations of 2-PMPA in the kidney;

FIG. 2A and FIG. 2B show that, in contrast to the presently disclosed prodrugs of 2-PMPA, a similar prodrug of the alternative urea-based PSMA ligand, ZJ-43, does not exhibit increased distribution to the mouse kidneys or salivary glands (FIG. 2B) relative to administration of ZJ-43 as parent (FIG. 2A);

FIG. 3A and FIG. 3B show that in prostate cancer tumor-bearing mice, Tris-POC-2-PMPA administration (FIG. 3B) results in significantly increased kidney and salivary gland delivery of 2-PMPA and improved kidney: tumor and salivary:tumor ratios relative to administration of equimolar 2-PMPA (FIG. 3A). Concentrations of 2-PMPA in plasma, tumor, salivary glands, and kidneys were measured at multiple time points after tail vein administration of either 2-PMPA or Tris-POC-2-PMPA (3 mg/kg or molar equivalent, i.v.) to NSG mice harboring subcutaneous xenografts of human C4-2 prostate cancer cells;

FIG. 4A, FIG. 4B, FIG. 4C, and FIG. 4D show baseline PET-imaging of non-tumor-bearing mice (presented as maximum intensity projections) 1 h after injection of 20 MBq $^{68}$Ga-PSMA-617 (FIG. 4A) and quantification of renal uptake by mSUV (FIG. 4C). Same animals re-imaged another 1 h after subsequent injection of Tris-POC-2-PMPA (0.5 mg/kgBW) (FIG. 4B). Tracer concentrations in the kidneys were then quantified by mSUV (FIG. 4D);

FIG. 5A, FIG. 5B, FIG. 5C, and FIG. 5D show baseline PET of LNCaP tumor xenograft (left shoulder) bearing mice 1 h after injection of $^{68}$Ga-PSMA-617 (FIG. 5A) and quantification of renal and tumor uptake by mSUV (FIG. 5C). Same animals were re-imaged another 1 h after subsequent injection of different doses Tris-POC-2-PMPA (or saline as control) (FIG. 5B), then tumor and kidney uptake were quantified (FIG. 5D);

FIG. 6A, FIG. 6B, FIG. 6C, and FIG. 6D show the biodistribution of $^{68}$Ga-PSMA-617 1 h p.i. without (FIG. 6A, left) or after Tris-POC-2-PMPA pre-dosing (FIG. 6A, right) presented as maximum intensity projections in a healthy subject. Without pre-dosing the kidney uptake increases over time, in contrast the time-activity-curve implies saturation of kidney binding by pre-dosing with 0.05 mg/kgBW Tris-POC-2-PMPA 10 min before the PET-tracer (FIG. 6C). A similar effect was observed for the time-activity-curve of parotid glands (FIG. 6D). Coronar thin slices through the kidney of the subjects without (FIG. 6B, top) or with pre-dosing (FIG. 6B, bottom), imply that saturation of the PSMA binding sites physiological expressed in the proximal tubules, which vice versa are located in the renal cortices. Without wishing to be bound to any one particular theory, it is thought that this observation presents the proposed mechanism of action for the presently disclosed methods;

FIG. 7 shows the intraindividual comparison of $^{68}$Ga-PSMA-617 biodistribution 1 h p.i. without or with Tris-POC-2-PMPA pre-dosing presented as maximum intensity projections in a prostate cancer patient. When pre-treated with Tris-POC-2-PMPA, the patient exhibited similar tracer uptake in the tumor, but significantly reduced kidney and salivary gland uptake; and FIG. 8 shows the effect of Tris-POC-2-PMPA pre-treatment on biodistribution and absorbed radiation dose to each organ or metastases after administration of $^{177}$Lu-PSMA-617 in prostate cancer patients compared to historical controls that received the radiotherapeutic without Tris-POC-2-PMPA. Based on positive results in a diagnostic PET scan, two patients received Tris-POC-2-PMPA (10 mg, i.v.) 15 minutes prior to infusion with $^{177}$Lu-PSMA-617. Relative to historical controls from the same center (Kratochwil, et al., 2016), Tris-POC-2-PMPA pre-treatment reduced radiotherapeutic uptake in the parotid gland, submandibular gland, and kidneys by between 45% and 75%. In contrast, Tris-POC-2-PMPA pre-treatment had little or no effect on the dose to metastases with all values falling within the standard deviation of historical controls, and, crucially, at or above absorbed dose values reported to result in therapeutic efficacy (Kratochwil, et al., 2016).

DETAILED DESCRIPTION

The presently disclosed subject matter now will be described more fully hereinafter with reference to the accompanying Figures, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

I. Prodrugs of 2-PMPA for Healthy Tissue Protection During PSMA-Targeted Cancer Imaging or Radiotherapy Prostate Specific Membrane Antigen (PSMA), also termed GCPII (glutamate carboxypeptidase II) and FOLH1, is a metallopeptidase that catalyzes the hydrolysis of N-acetylated aspartate-glutamate (NAAG) to N-acetyl aspartate (NAA) and glutamate and cleaves terminal glutamate moieties sequentially from folate polyglutamate. One of the most potent, selective, and efficacious PSMA inhibitors is 2-(phosphonomethyl)pentanedioic acid (2-PMPA). 2-PMPA, however, is a highly polar compound with multiple carboxylates and a zinc binding group and it has negligible oral availability and poor tissue penetration. Therefore, in most cases, it must be dosed intravenously, intraperitoneally, or locally to achieve the desired effects. This fact limits its potential use as a therapeutic agent.

The presently disclosed subject matter demonstrates, in part, that certain prodrugs of 2-PMPA (see, e.g., Majer et al., 2016), when administered to animals unexpectedly accumulated in the kidney and salivary glands. Importantly, one of these prodrugs, when administered to mice bearing prostate cancer xenografts, exhibited 3- and 57-fold preferential delivery of 2-PMPA to rodent salivary glands and kidneys, respectively, versus tumor. Without wishing to be bound to any one particular theory, given this profile, it was thought that administration of prodrugs of 2-PMPA could prevent subsequent PSMA radioligand binding to these "off-target" non-cancer tissues without hindering radioligand uptake in the target tumor tissue. Although particular prodrugs of 2-PMPA are disclosed herein, one of ordinary skill in the art would appreciate that other prodrugs of 2-PMPA and any GCPII inhibitor that exhibits a differential accumulation in kidneys and salivary glands could be suitable for use with the presently disclosed methods.

The presently disclosed subject matter demonstrates the efficacy of this approach. For example, in mice bearing prostate tumors, a healthy human volunteer, and a prostate cancer patient, administration of a 2-PMPA prodrug prior to PSMA radioligand administration successfully displaced radioligand binding in kidney and salivary glands, but spared tumor uptake. Thus, the presently disclosed 2-PMPA prodrugs potentially can be used clinically as pretreatment agents to improve the specificity and reduce the toxicity of PSMA-targeted imaging agents and radiotherapies.

More particularly, the presently disclosed subject matter provides a new use for a class of prodrugs of 2-PMPA that alter tissue distribution of 2-PMPA to non-cancer tissues and improves 2-PMPA delivery to healthy organs. The presently disclosed prodrugs preferentially distribute to the kidney, lacrimal glands, and salivary glands, which represent sites of off-target binding and toxicity for PSMA-targeted prostate cancer imaging agents and radiotherapies.

Accordingly, the presently disclosed subject matter provides the unexpected finding of a PSMA small molecule inhibitor with enhanced accumulation in non-cancer tissues (e.g., kidney, lacrimal glands, and salivary gland). The animal data, which are confirmed in humans, indicates that the presently disclosed 2-PMPA prodrugs can be used in conjunction with PSMA-targeted imaging or radiotherapy to decrease non-selectivity and potentially dose-limiting toxicities, respectively.

Accordingly, in some embodiments, the presently disclosed subject matter provides a method for preventing or reducing an accumulation of a prostate-specific membrane antigen (PSMA) theranostic agent in an off-target non-cancer tissue, the method comprising administering to a subject being treated with a PSMA theranostic agent a prodrug of 2-(phosphonomethyl)pentanedioic acid (2-PMPA) in an amount effective to prevent or reduce binding of the PSMA theranostic agent to an off-target non-cancer tissue. In such embodiments, the off-target tissue is shielded from the radio therapeutic agent.

In some embodiments, the prodrug of 2-PMPA is administered in combination with a PSMA theronostic agent. By "in combination with" is meant the administration of one or more presently disclosed compounds with one or more therapeutic agents either before, simultaneously, sequentially, or a combination thereof. Therefore, a cell or a subject can receive one or more presently disclosed compounds and one or more therapeutic agents at the same time (i.e., simultaneously) or at different times (i.e., sequentially, in either order, i.e., before or after, on the same day or on different days), so long as the effect of the combination of both agents is achieved in the cell or the subject. When administered sequentially, the agents can be administered within 1, 5, 10, 30, 60, 120, 180, 240 minutes or longer of one another. In other embodiments, agents administered sequentially, can be administered within 1, 5, 10, 15, 20 or more days of one another. Where the one or more presently disclosed compounds and one or more therapeutic agents are administered simultaneously, they can be administered to the cell or administered to the subject as separate pharmaceutical compositions, each comprising either one or more presently disclosed compounds or one or more therapeutic agents, or they can contact the cell as a single composition or be administered to a subject as a single pharmaceutical composition comprising both agents. In particular embodiments, the prodrug of 2-PMPA is administered to the subject before the PSMA theronostic or imaging agent is administered. In such embodiments, the subject is "pre-treated" with the prodrug of 2-PMPA. In other embodiments, the prodrug of 2-PMPA is administered to the subject simultaneously with the PSMA theronostic or imaging agent.

In certain embodiments, the off-target tissue is in an organ selected from the group consisting of kidney, lacrimal glands, and salivary glands.

In particular embodiments, the PSMA theronostic agent is selected from the group consisting of CTT1403, MIP-1095, PSMA-11, PSMA-617, PSMA-R2, and PSMA I&T. One of ordinary skill in the art would recognize that other radiolabeled PSMA theronostic agents, indeed, any PSMA-targeted agent regardless of binding site or whether it's a biologic or small molecule, known in the art would be suitable for use with the presently disclosed methods.

Representative prodrugs of 2-PMPA suitable for use with the presently disclosed methods include those disclosed in international PCT patent application publication number WO2016022827A1 to Slusher et al., for PRODRUGS OF PROSTATE SPECIFIC MEMBRANE ANTIGEN (PSMA)

INHIBITOR, published Feb. 11, 2016, which is incorporated herein by reference in its entirety.

Structures of representative 2-PMPA prodrugs are provided in Table 1.

TABLE 1

Structures of Representative 2-PMPA Prodrugs and Metabolic Products

| IOCB No./ Compound No. | Structure | MW |
| --- | --- | --- |
| 2-PMPA | | 226.12 |
| 1 | | 254.17 |
| 2 | | 282.23 |
| 3 | | 310.28 |
| 4 | | 458.35 |

TABLE 1-continued

Structures of Representative 2-PMPA Prodrugs and Metabolic Products

| IOCB No./ Compound No. | Structure | MW |
|---|---|---|
| 5 | | 454.41 |
| 6 | | 486.41 |
| 7 | | 472.38 |
| 8 | | 468.43 |
| 9 | | 240.15 |

TABLE 1-continued

Structures of Representative 2-PMPA Prodrugs
and Metabolic Products

| IOCB No./<br>Compound No. | Structure | MW |
|---|---|---|
| 10<br>(Tris-POC-2-PMPA) | | 574.47 |
| 11 | | 582.57 |
| 12 | | 791.13 |
| 13 | | 838.90 |

TABLE 1-continued

Structures of Representative 2-PMPA Prodrugs and Metabolic Products

| IOCB No./ Compound No. | Structure | MW |
| --- | --- | --- |
| 14 | | 482.46 |
| 15 | | 486.40 |
| 16 | | 606.58 |
| 17 | | 604.60 |
| 18 | | 510.51 |

TABLE 1-continued

Structures of Representative 2-PMPA Prodrugs
and Metabolic Products

| IOCB No./ Compound No. | Structure | MW |
|---|---|---|
| 19 | | 482.46 |
| 20 | | 486.40 |
| 21 | | 592.57 |
| 22 | | 520.68 |
| 23 (Tris-POM-2-PMPA) | | 568.55 |

TABLE 1-continued

Structures of Representative 2-PMPA Prodrugs
and Metabolic Products

| IOCB No./<br>Compound No. | Structure | MW |
|---|---|---|
| 24 | | 616.55 |
| 25 | | 543.46 |
| 26 | | 571.51 |
| 27 | | 522.44 |

TABLE 1-continued
Structures of Representative 2-PMPA Prodrugs and Metabolic Products
| IOCB No./<br>Compound No. | Structure | MW |
|---|---|---|
| 28 | 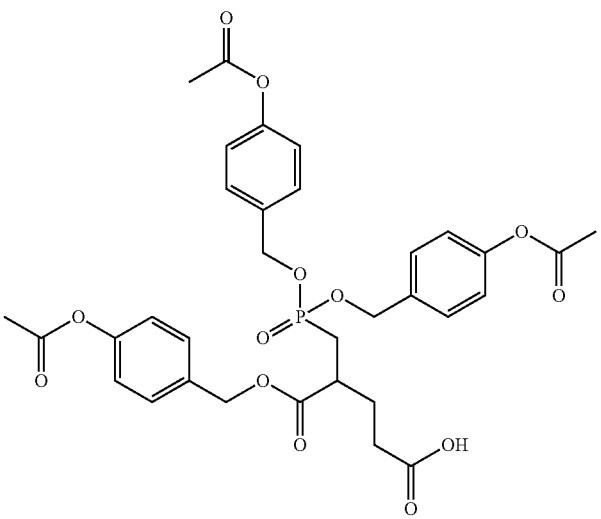 | 670.60 |
| 29 | 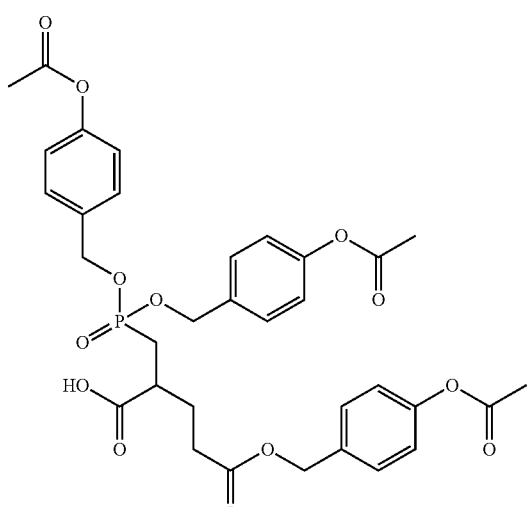 | 670.60 |
| 30 | 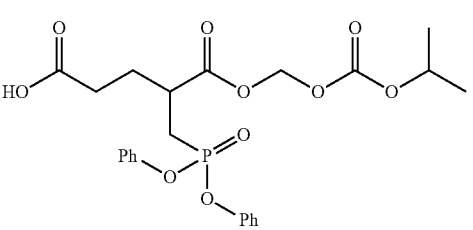 | 494.43 |

TABLE 1-continued

Structures of Representative 2-PMPA Prodrugs and Metabolic Products

| IOCB No./ Compound No. | Structure | MW |
|---|---|---|
| 31 | | 540.50 |
| 32 | | 450.29 |
| 33 | | 450.29 |
| 34 | | 540.41 |
| 35 | | 674.45 |

TABLE 1-continued

Structures of Representative 2-PMPA Prodrugs and Metabolic Products

| IOCB No./Compound No. | Structure | MW |
|---|---|---|
| 36 | | 562.37 |

In yet other embodiments, fine tuning of the hydrolysis rate can be evaluated by a combination of POC and methyl-substituted POC, as illustrated by the following compounds:

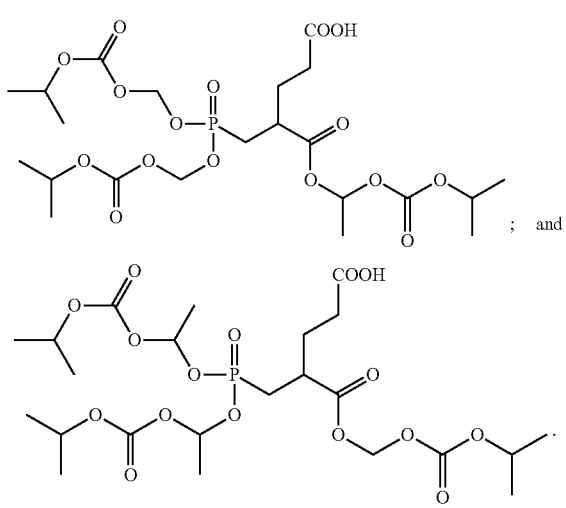

Further directions in 2-PMPA prodrugs include the following approach, including more easily hydrolysable phenyl esters; anhydrides, and dioxolone esters employing paraoxonase for bioconversion:

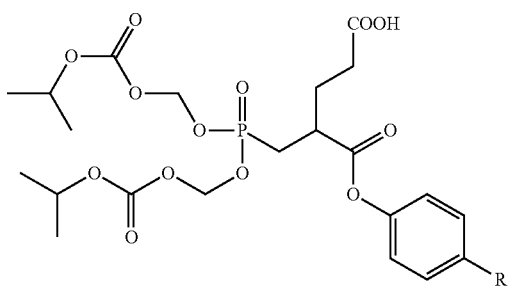

Additionally, the following dioxolone esters and anhydride prodrugs of 2-PMPA are contemplated:

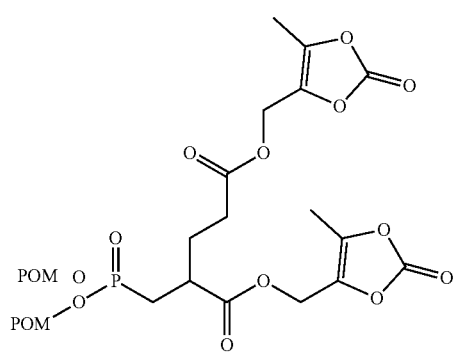

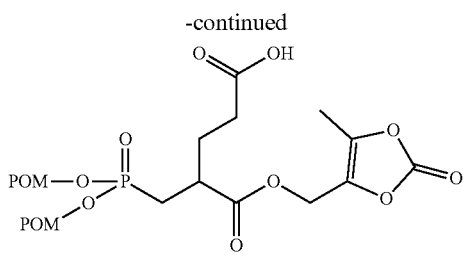
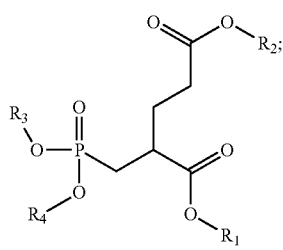

Further examples of alternative carboxy-esters prodrugs of 2-PMPA also include:

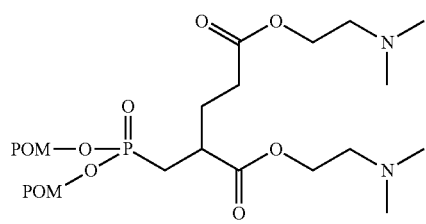
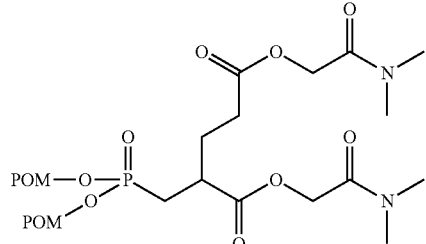
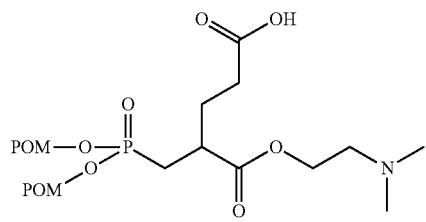
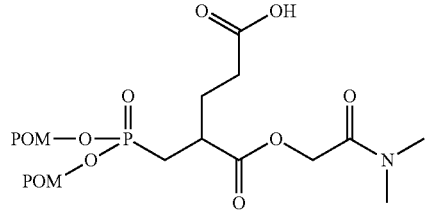

More particularly, in some embodiments, the prodrug of 2-PMPA comprises a compound of formula (I) or formula (II):

wherein:
each $R_1$, $R_2$, $R_3$, and $R_4$ is independently selected from the group consisting of H, alkyl, Ar, $-(CR_5R_6)_n-Ar$, $-(CR_5R_6)_n-O-C(=O)-R_7$, $-(CR_5R_6)_n-C(=O)-O-R_7$, $-(CR_5R_6)_n-O-C(=O)-O-R_7$, $-(CR_5R_6)_n-O-R_7$, $-(CR_5R_6)_n-O-[(CR_5R_6)_n-O]_m-R_7$, $-(CR_5R_6)_n-Ar-O-C(=O)-R_7$, $-Ar-C(=O)-O-(CR_5R_6)_n-R_7$, $-(CR_5R_6)_n-NR_8R_9$, and $-(CR_5R_6)_n-C(=O)-NR_8R_9$;

wherein:
n is an integer from 1 to 20;
m is an integer from 1 to 20;
each $R_3'$ and $R_4'$ are independently H or alkyl;
each $R_5$ and $R_6$ is independently selected from the group consisting of H, alkyl, and alkylaryl;
each $R_7$ is independently straightchain or branched alkyl;
Ar is aryl, substituted aryl, heteroaryl or substituted heteroaryl; and
$R_8$ and $R_9$ are each independently H or alkyl; and
pharmaceutically acceptable salts thereof.

As further defined herein below, the "alkyl" represented by $R_1$-$R_9$ and $R_3'$ and $R_4'$ of Formula (I) and Formula (II) can be a $C_1$, $C_2$, $C_3$, $C_4$, $C_5$, $C_6$, $C_7$, or $C_8$ linear or branched alkyl, in some embodiments, $C_{1-4}$ substituted or unsubstituted alkyl, in some embodiments, $C_{1-6}$ substituted or unsubstituted alkyl, in some embodiments, $C_{1-8}$ alkyl substituted or unsubstituted alkyl, including, but not limited to, methyl, ethyl, n-propyl, isopropyl, n-butyl, isobutyl, sec-butyl, tert-butyl, n-pentyl, sec-pentyl, isopentyl, neopentyl, n-hexyl, sec-hexyl, n-heptyl, n-octyl, and the like, each of which can include one or more substitutents. Representative substituent groups include, but are not limited to, alkyl, substituted alkyl, halogen, aryl, substituted aryl, alkoxyl, hydroxyl, nitro, amino, alkylamino, dialkylamino, sulfate, cyano, mercapto, and alkylthio.

In particular embodiments, the compound of formula (I) is selected from the group consisting of:

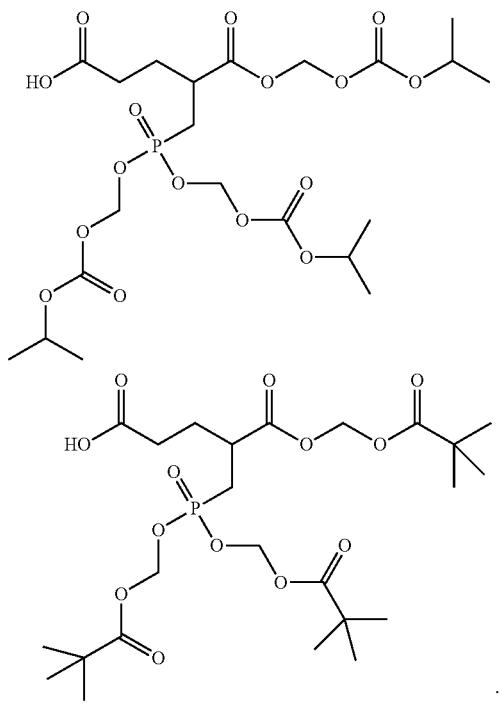
and
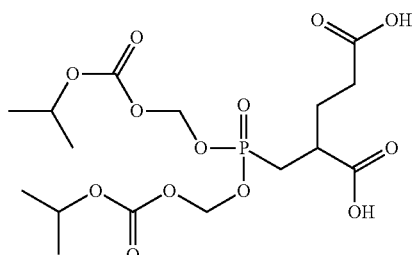
and
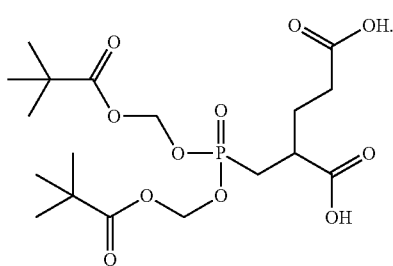 [SMILES: CC(C)(C)C(=O)OCOP(=O)(CC(CCC(=O)O)C(=O)O)OCOC(=O)C(C)(C)C]
In particular embodiments, the compound of formula (I) is selected from the group consisting of:
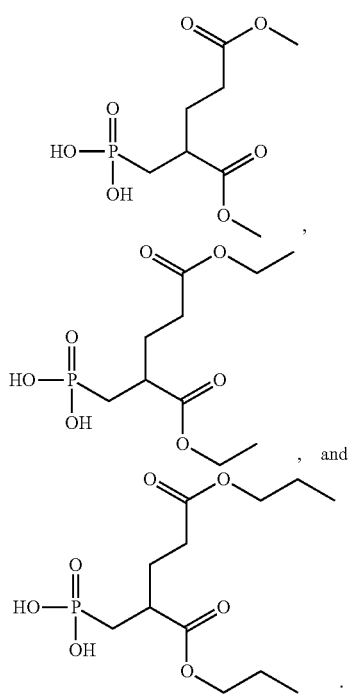
In particular embodiments, the compound of formula (I) is selected from the group consisting of:
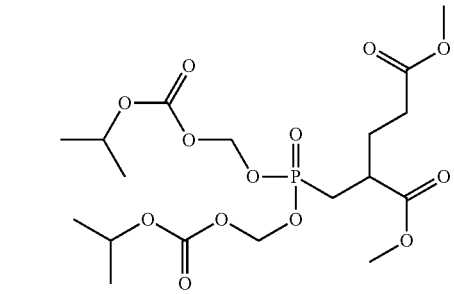 [SMILES: COC(=O)CCC(CP(=O)(OCOC(=O)OC(C)C)OCOC(=O)OC(C)C)C(=O)OC]
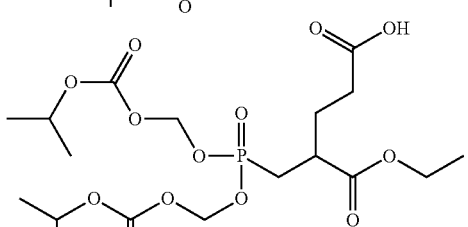
and
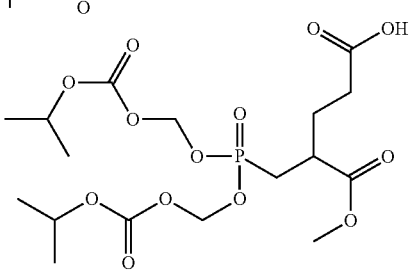
In particular embodiments, the compound of formula (I) is selected from the group consisting of:
In particular embodiments, the compound of formula (I) is In particular embodiments, the compound of formula (I) is

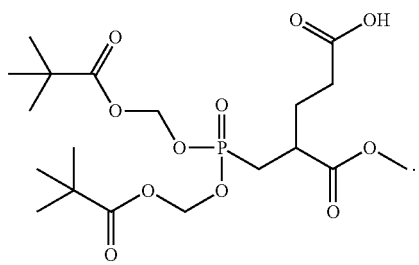 [SMILES: COC(=O)C(CCC(=O)O)CP(=O)(OCOC(=O)C(C)(C)C)OCOC(=O)C(C)(C)C]

In particular embodiments, the compound of formula (I) is

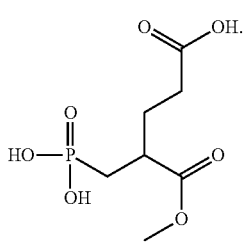

In particular embodiments, the compound of formula (I) is

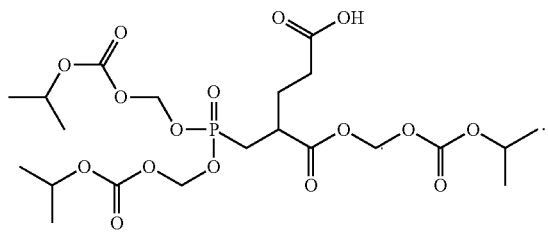 [SMILES: CC(C)OC(=O)OCOC(=O)C(CCC(=O)O)CP(=O)(OCOC(=O)OC(C)C)OCOC(=O)OC(C)C]

In particular embodiments, the compound of formula (I) is

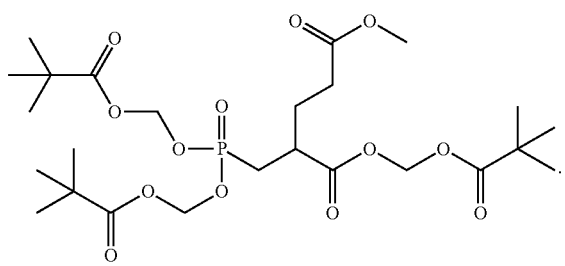 [SMILES: COC(=O)CCC(CP(=O)(OCOC(=O)C(C)(C)C)OCOC(=O)C(C)(C)C)C(=O)OCOC(=O)C(C)(C)C]

In particular embodiments, the compound of formula (I) is

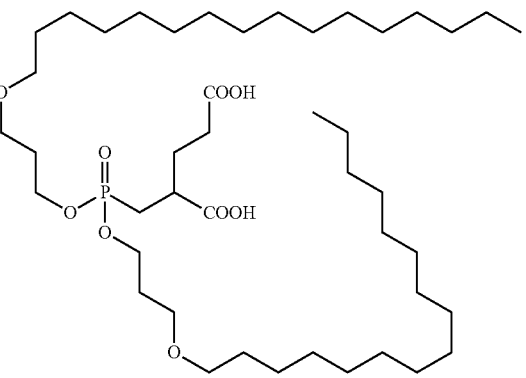

In particular embodiments, the compound of formula (I) is selected from the group consisting of:

and

In particular embodiments, the compound of formula (I) is

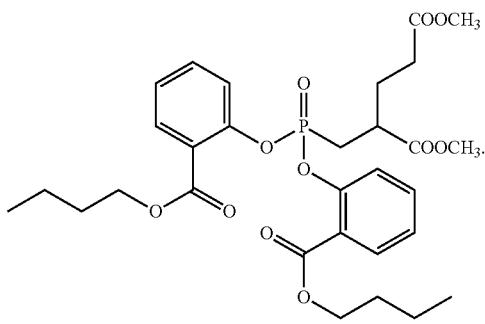 [SMILES: CCCCOC(=O)c1ccccc1OP(=O)(CC(CCC(=O)OC)C(=O)OC)Oc1ccccc1C(=O)OCCCC]

In particular embodiments, the compound of formula (I) is

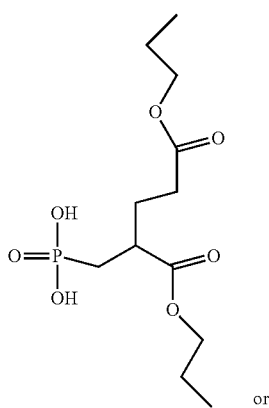

or

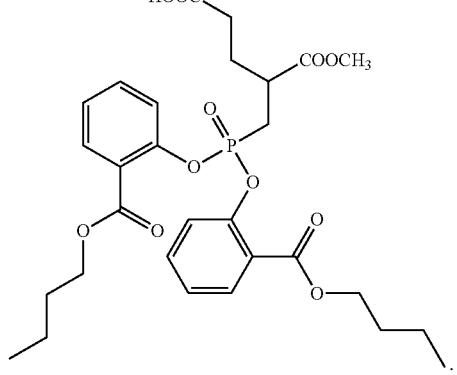

In particular embodiments, the compound of formula (I) is selected from the group consisting of:

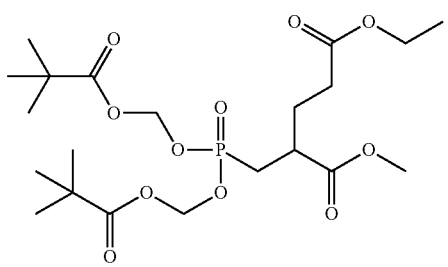

and

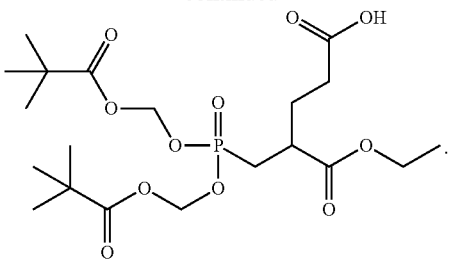

In particular embodiments, the compound of formula (I) is

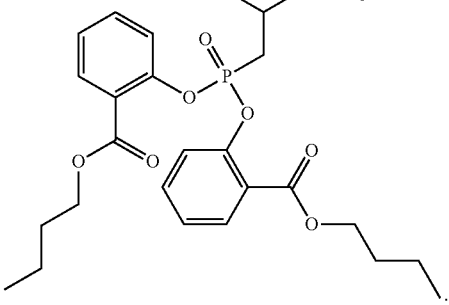

In particular embodiments, the compound of formula (I) is

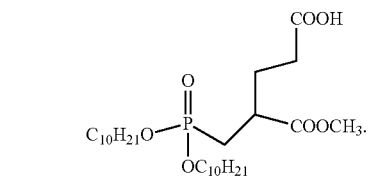

In particular embodiments, the compound of formula (I) is

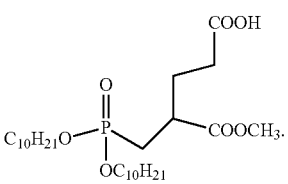

In particular embodiments, the compound of formula (I) is

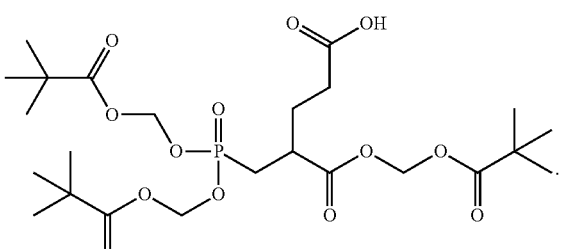

In particular embodiments, the compound of formula (I) is

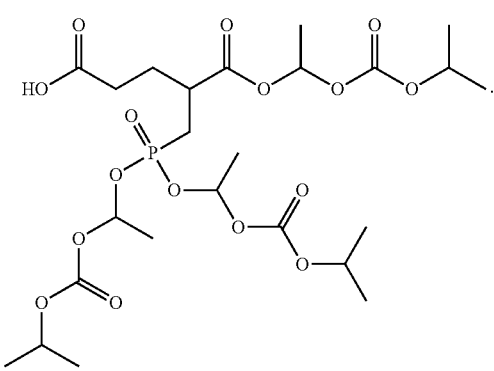 [SMILES: CC(C)OC(=O)OC(C)OC(=O)C(CCC(=O)O)CP(=O)(OC(C)OC(=O)OC(C)C)OC(C)OC(=O)OC(C)C]
In particular embodiments, the compound of formula (I) is selected from the group consisting of:
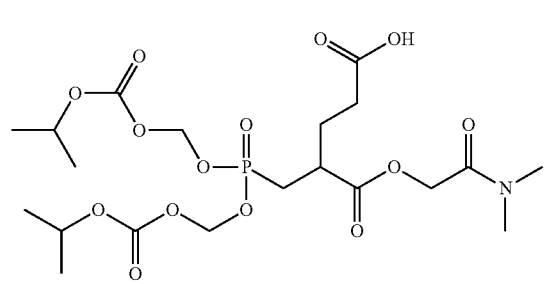
and
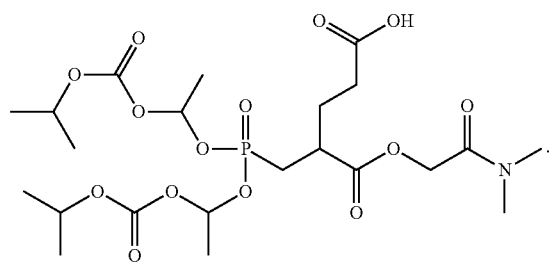
In particular embodiments, the compound of formula (I) is selected from the group consisting of:
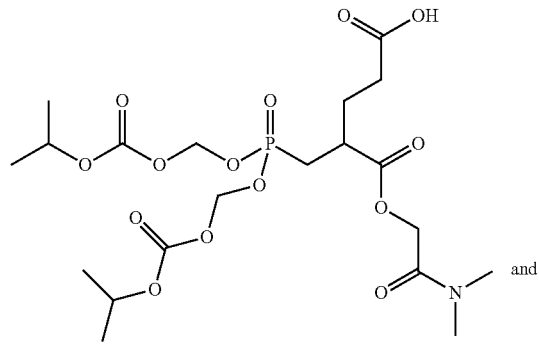
and
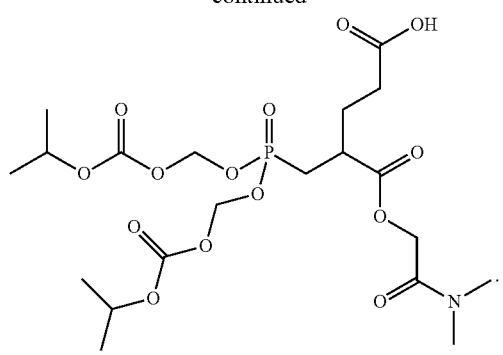
In particular embodiments, the compound of formula (I) is selected from the group consisting of:
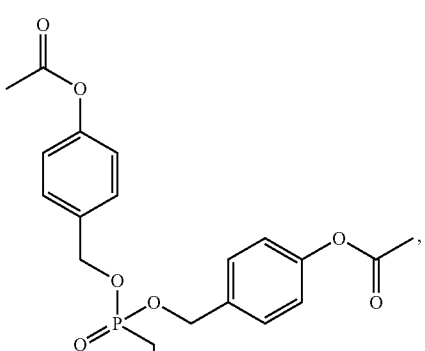
and
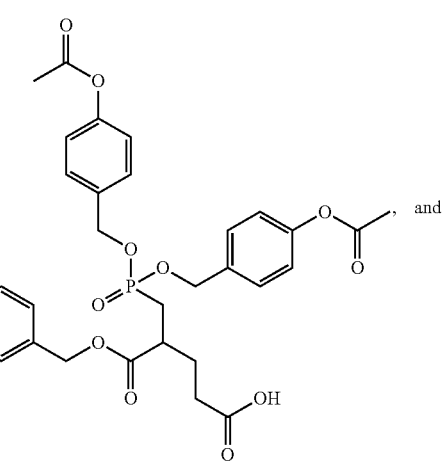

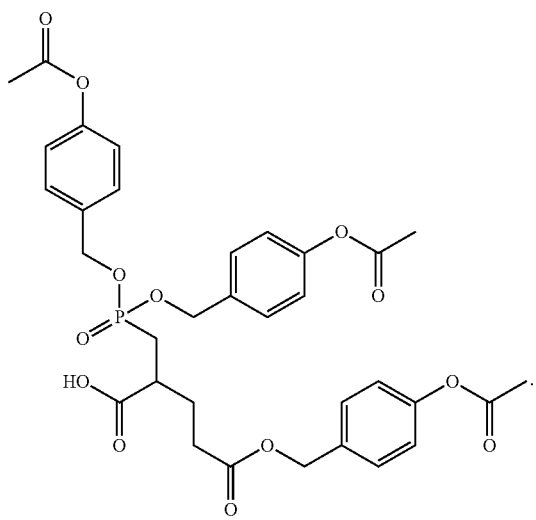
In particular embodiments, the compound of formula (I) is
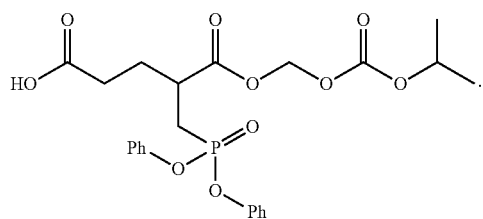 [SMILES: CC(C)OC(=O)OCOC(=O)C(CCC(=O)O)CP(=O)(Oc1ccccc1)Oc1ccccc1]
In particular embodiments, the compound of formula (I) is selected from the group consisting of:
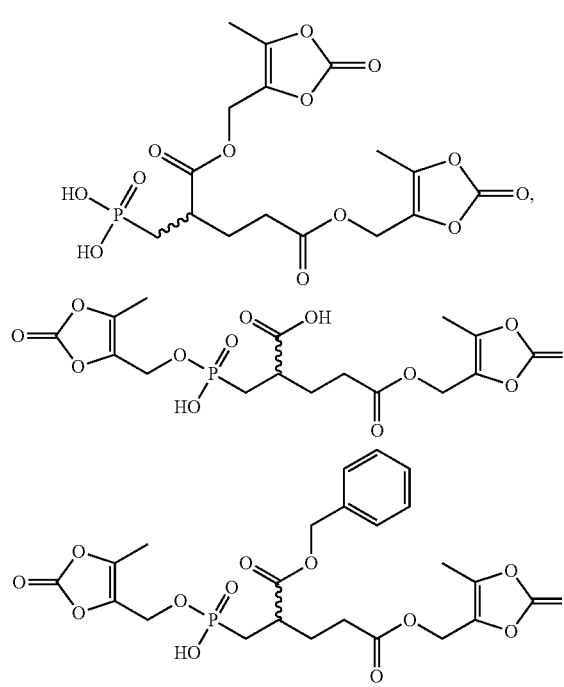
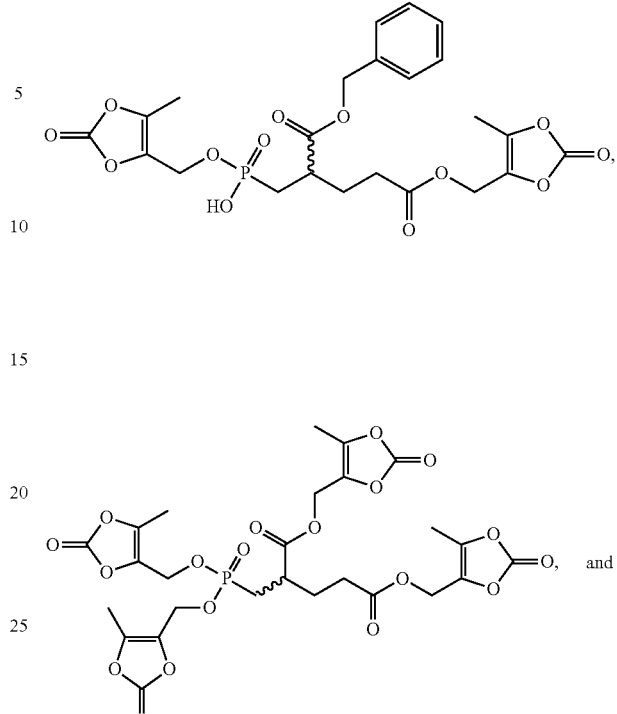
In particular embodiments, the compound of formula (II) is
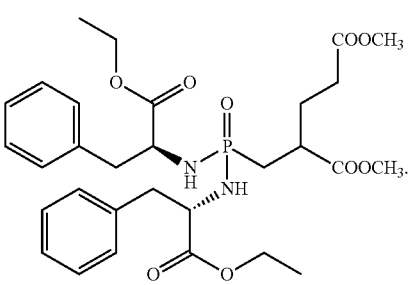 [SMILES: CCOC(=O)[C@H](Cc1ccccc1)NP(=O)(CC(CCC(=O)OC)C(=O)OC)N[C@@H](Cc1ccccc1)C(=O)OCC]
In particular embodiments, the compound of formula (II) is

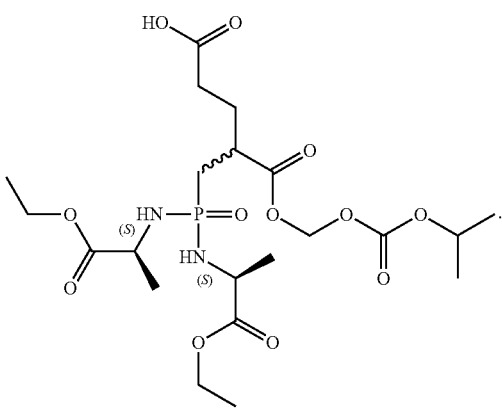

In other embodiments, the presently disclosed subject matter provides a method for reducing salivary gland damage in a patient receiving PSMA-targeted therapy for cancer, comprising administering to the patient a therapeutically effective amount of a prodrug of 2-PMPA.

In particular embodiments, the salivary gland damage gives rise to a side effect selected from the group consisting of xerostomia, thickened saliva, reduced saliva, mouth sores, hoarseness, trouble swallowing, loss of taste, and combinations thereof.

In yet other embodiments, the presently disclosed subject matter provides a method for reducing kidney damage in a patient receiving PSMA-targeted therapy for cancer, comprising administering to the patient a therapeutically effective amount of a prodrug of 2-PMPA.

In particular embodiments, the methods of reducing salivary gland damage and/or kidney damage the prodrug of 2-PMPA comprises a compound of formula (I) or formula (II):

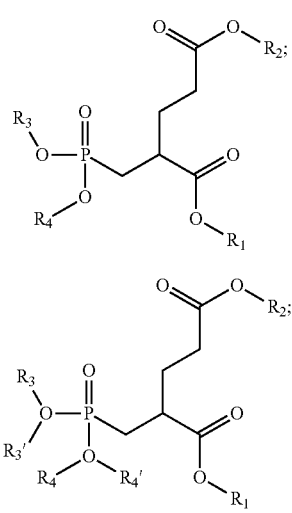

wherein:
each $R_1$, $R_2$, $R_3$, and $R_4$ is independently selected from the group consisting of H, alkyl, Ar, —$(CR_5R_6)_n$—Ar, —$(CR_5R_6)_n$—O—C(=O)—$R_7$, —$(CR_5R_6)_n$—C(=O)—O—$R_7$, —$(CR_5R_6)_n$—O—C(=O)—O—$R_7$, —$(CR_5R_6)_n$—O—$R_7$, —$(CR_5R_6)_n$—O—[$(CR_5R_6)_n$—O]$_m$—$R_7$, —$(CR_5R_6)_n$—Ar—O—C(=O)—$R_7$, —Ar—C(=O)—O—$(CR_5R_6)_n$—$R_7$, —$(CR_5R_6)_n$—$NR_8R_9$, and —$(CR_5R_6)_n$—C(=O)—$NR_8R_9$;

wherein:
n is an integer from 1 to 20;
m is an integer from 1 to 20;
each $R_3'$ and $R_4'$ are independently H or alkyl;
each $R_5$ and $R_6$ is independently selected from the group consisting of H, alkyl, and alkylaryl;
each $R_7$ is independently straightchain or branched alkyl;
Ar is aryl, substituted aryl, heteroaryl or substituted heteroaryl; and
$R_8$ and $R_9$ are each independently H or alkyl; and
pharmaceutically acceptable salts thereof.

In yet more particular embodiments, the prodrug of 2-PMPA is selected from the group consisting of:

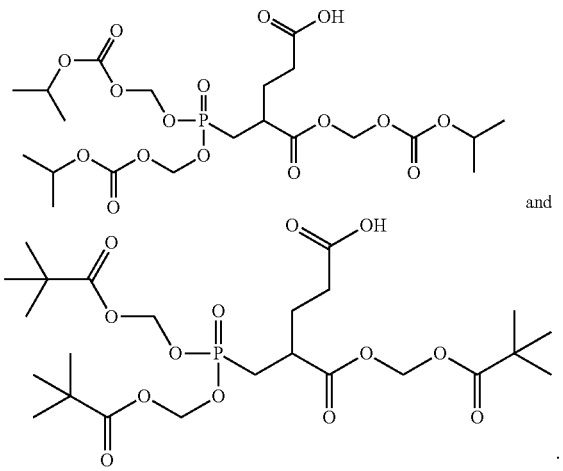

In certain embodiments, the PSMA-targeted imaging or therapeutic agent is selected from the group consisting of 117Lu-PSMA-617, 131I-MIP-1095, 177Lu-PSMA-I&T, 177Lu-PSMA-R2, 225Ac-PSMA-617, 227Th-PSMA-ADC, CTT1403, CTT1700, 68Ga-PSMA-11, 18F-DCFPyL, CTT1057, 68Ga-PSMA-R2, and 68Ga-PSMA-617.

In some embodiments, the PSMA-targeted therapeutic is a radiotherapeutic administered in a cumulative amount from about 3 GBq to about 100 GBq. In particular embodiments, the PSMA-targeted radiotherapeutic is administered in a cumulative amount from about 52 GBq to about 100 GBq.

In some embodiments, the PSMA-targeted therapeutic and 2-PMPA prodrug are administered for about 1 to about 15 treatment cycles. In particular embodiments, the PSMA-targeted therapeutic and 2-PMPA prodrug are administered for about 6 to about 15 treatment cycles.

In certain embodiments, the patient has not received previous treatment for cancer. In yet more certain embodiments, the cancer is prostate cancer.

II. Pharmaceutical Compositions and Administration

In another aspect, the present disclosure provides a pharmaceutical composition including a compound of formula (I), or a compound of formula (II), alone or in combination with one or more additional therapeutic agents in admixture with a pharmaceutically acceptable excipient. One of skill in the art will recognize that the pharmaceutical compositions include the pharmaceutically acceptable salts of the compounds described above.

In therapeutic and/or diagnostic applications, the compounds of the disclosure can be formulated for a variety of modes of administration, including systemic and topical or localized administration. Techniques and formulations generally may be found in Remington: The Science and Practice of Pharmacy (20$^{th}$ ed.) Lippincott, Williams & Wilkins (2000).

The compounds according to the disclosure are effective over a wide dosage range. For example, in the treatment of adult humans, dosages from 0.01 to 1000 mg, from 0.5 to 100 mg, from 1 to 50 mg per day, and from 5 to 40 mg per day are examples of dosages that may be used. A non-limiting dosage is 10 to 30 mg per day. The exact dosage will depend upon the route of administration, the form in which the compound is administered, the subject to be treated, the body weight of the subject to be treated, and the preference and experience of the attending physician.

Pharmaceutically acceptable salts are generally well known to those of ordinary skill in the art, and may include, by way of example but not limitation, acetate, benzenesulfonate, besylate, benzoate, bicarbonate, bitartrate, bromide, calcium edetate, carnsylate, carbonate, citrate, edetate, edisylate, estolate, esylate, fumarate, gluceptate, gluconate, glutamate, glycollylarsanilate, hexylresorcinate, hydrabamine, hydrobromide, hydrochloride, hydroxynaphthoate, iodide, isethionate, lactate, lactobionate, malate, maleate, mandelate, mesylate, mucate, napsylate, nitrate, pamoate (embonate), pantothenate, phosphate/diphosphate, polygalacturonate, salicylate, stearate, subacetate, succinate, sulfate, tannate, tartrate, or teoclate. Other pharmaceutically acceptable salts may be found in, for example, Remington: The Science and Practice of Pharmacy (20$^{th}$ ed.) Lippincott, Williams & Wilkins (2000). Pharmaceutically acceptable salts include, for example, acetate, benzoate, bromide, carbonate, citrate, gluconate, hydrobromide, hydrochloride, maleate, mesylate, napsylate, pamoate (embonate), phosphate, salicylate, succinate, sulfate, or tartrate.

Depending on the specific conditions being treated, such agents may be formulated into liquid or solid dosage forms and administered systemically or locally. The agents may be delivered, for example, in a timed- or sustained-low release form as is known to those skilled in the art. Techniques for formulation and administration may be found in Remington: The Science and Practice of Pharmacy (20$^{th}$ ed.) Lippincott, Williams & Wilkins (2000). Suitable routes may include oral, buccal, intra-salivary, by inhalation spray, sublingual, rectal, transdermal, vaginal, transmucosal, nasal or intestinal administration; parenteral delivery, including intramuscular, subcutaneous, intramedullary injections, as well as intrathecal, direct intraventricular, intravenous, intra-articullar, intra-sternal, intra-synovial, intra-hepatic, intralesional, intracranial, intraperitoneal, intranasal, or intraocular injections or other modes of delivery.

For injection, the agents of the disclosure may be formulated and diluted in aqueous solutions, such as in physiologically compatible buffers such as Hank's solution, Ringer's solution, or physiological saline buffer. For such transmucosal administration, penetrants appropriate to the barrier to be permeated are used in the formulation. Such penetrants are generally known in the art.

Use of pharmaceutically acceptable inert carriers to formulate the compounds herein disclosed for the practice of the disclosure into dosages suitable for systemic administration is within the scope of the disclosure. With proper choice of carrier and suitable manufacturing practice, the compositions of the present disclosure, in particular, those formulated as solutions, may be administered parenterally, such as by intravenous injection. The compounds can be formulated readily using pharmaceutically acceptable carriers well known in the art into dosages suitable for oral administration. Such carriers enable the compounds of the disclosure to be formulated as tablets, pills, capsules, liquids, gels, syrups, slurries, suspensions and the like, for oral ingestion by a subject (e.g., patient) to be treated.

For nasal or inhalation delivery, the agents of the disclosure also may be formulated by methods known to those of skill in the art, and may include, for example, but not limited to, examples of solubilizing, diluting, or dispersing substances such as, saline, preservatives, such as benzyl alcohol, absorption promoters, and fluorocarbons.

Pharmaceutical compositions suitable for use in the present disclosure include compositions wherein the active ingredients are contained in an effective amount to achieve its intended purpose. Determination of the effective amounts is well within the capability of those skilled in the art, especially in light of the detailed disclosure provided herein.

In addition to the active ingredients, these pharmaceutical compositions may contain suitable pharmaceutically acceptable carriers comprising excipients and auxiliaries which facilitate processing of the active compounds into preparations which can be used pharmaceutically. The preparations formulated for oral administration may be in the form of tablets, dragees, capsules, or solutions.

Pharmaceutical preparations for oral use can be obtained by combining the active compounds with solid excipients, optionally grinding a resulting mixture, and processing the mixture of granules, after adding suitable auxiliaries, if desired, to obtain tablets or dragee cores. Suitable excipients are, in particular, fillers such as sugars, including lactose, sucrose, mannitol, or sorbitol; cellulose preparations, for example, maize starch, wheat starch, rice starch, potato starch, gelatin, gum tragacanth, methyl cellulose, hydroxypropylmethyl-cellulose, sodium carboxymethyl-cellulose (CMC), and/or polyvinylpyrrolidone (PVP: povidone). If desired, disintegrating agents may be added, such as the cross-linked polyvinylpyrrolidone, agar, or alginic acid or a salt thereof such as sodium alginate.

Dragee cores are provided with suitable coatings. For this purpose, concentrated sugar solutions may be used, which may optionally contain gum arabic, talc, polyvinylpyrrolidone, carbopol gel, polyethylene glycol (PEG), and/or titanium dioxide, lacquer solutions, and suitable organic solvents or solvent mixtures. Dye-stuffs or pigments may be added to the tablets or dragee coatings for identification or to characterize different combinations of active compound doses.

Pharmaceutical preparations that can be used orally include push-fit capsules made of gelatin, as well as soft, sealed capsules made of gelatin, and a plasticizer, such as glycerol or sorbitol. The push-fit capsules can contain the active ingredients in admixture with filler such as lactose, binders such as starches, and/or lubricants such as talc or magnesium stearate and, optionally, stabilizers. In soft capsules, the active compounds may be dissolved or suspended in suitable liquids, such as fatty oils, liquid paraffin, or liquid polyethylene glycols (PEGs). In addition, stabilizers may be added.

III. Definitions

Although specific terms are employed herein, they are used in a generic and descriptive sense only and not for purposes of limitation. Unless otherwise defined, all technical and scientific terms used herein have the same meaning as commonly understood by one of ordinary skill in the art to which this presently described subject matter belongs.

While the following terms in relation to compounds of formula (I) are believed to be well understood by one of ordinary skill in the art, the following definitions are set forth to facilitate explanation of the presently disclosed subject matter. These definitions are intended to supplement and illustrate, not preclude, the definitions that would be apparent to one of ordinary skill in the art upon review of the present disclosure.

The terms substituted, whether preceded by the term "optionally" or not, and substituent, as used herein, refer to the ability, as appreciated by one skilled in this art, to change one functional group for another functional group provided that the valency of all atoms is maintained. When more than one position in any given structure may be substituted with more than one substituent selected from a specified group, the substituent may be either the same or different at every position. The substituents also may be further substituted (e.g., an aryl group substituent may have another substituent off it, such as another aryl group, which is further substituted, for example, with fluorine at one or more positions).

Where substituent groups or linking groups are specified by their conventional chemical formulae, written from left to right, they equally encompass the chemically identical substituents that would result from writing the structure from right to left, e.g., —CH$_2$O— is equivalent to —OCH$_2$—; —C(=O)O— is equivalent to —OC(=O)—; —OC(=O)NR— is equivalent to —NRC(=O)O—, and the like.

When the term "independently selected" is used, the substituents being referred to (e.g., R groups, such as groups $R_1$, $R_2$, and the like, or variables, such as "m" and "n"), can be identical or different. For example, both $R_1$ and $R_2$ can be substituted alkyls, or $R_1$ can be hydrogen and $R_2$ can be a substituted alkyl, and the like.

The terms "a," "an," or "a(n)," when used in reference to a group of substituents herein, mean at least one. For example, where a compound is substituted with "an" alkyl or aryl, the compound is optionally substituted with at least one alkyl and/or at least one aryl. Moreover, where a moiety is substituted with an R substituent, the group may be referred to as "R-substituted." Where a moiety is R-substituted, the moiety is substituted with at least one R substituent and each R substituent is optionally different.

A named "R" or group will generally have the structure that is recognized in the art as corresponding to a group having that name, unless specified otherwise herein. For the purposes of illustration, certain representative "R" groups as set forth above are defined below.

Description of compounds of the present disclosure are limited by principles of chemical bonding known to those skilled in the art. Accordingly, where a group may be substituted by one or more of a number of substituents, such substitutions are selected so as to comply with principles of chemical bonding and to give compounds which are not inherently unstable and/or would be known to one of ordinary skill in the art as likely to be unstable under ambient conditions, such as aqueous, neutral, and several known physiological conditions. For example, a heterocycloalkyl or heteroaryl is attached to the remainder of the molecule via a ring heteroatom in compliance with principles of chemical bonding known to those skilled in the art thereby avoiding inherently unstable compounds.

The term hydrocarbon, as used herein, refers to any chemical group comprising hydrogen and carbon. The hydrocarbon may be substituted or unsubstituted. As would be known to one skilled in this art, all valencies must be satisfied in making any substitutions. The hydrocarbon may be unsaturated, saturated, branched, unbranched, cyclic, polycyclic, or heterocyclic. Illustrative hydrocarbons are further defined herein below and include, for example, methyl, ethyl, n-propyl, iso-propyl, cyclopropyl, allyl, vinyl, n-butyl, tert-butyl, ethynyl, cyclohexyl, methoxy, diethylamino, and the like.

The term "alkyl," by itself or as part of another substituent, means, unless otherwise stated, a straight (i.e., unbranched) or branched chain, acyclic or cyclic hydrocarbon group, or combination thereof, which may be fully saturated, mono- or polyunsaturated and can include di- and multivalent groups, having the number of carbon atoms designated (i.e., $C_1$-$C_{10}$ means one to ten carbons). In particular embodiments, the term "alkyl" refers to $C_{1-20}$ inclusive, linear (i.e., "straight-chain"), branched, or cyclic, saturated or at least partially and in some cases fully unsaturated (i.e., alkenyl and alkynyl) hydrocarbon radicals derived from a hydrocarbon moiety containing between one and twenty carbon atoms by removal of a single hydrogen atom.

Representative saturated hydrocarbon groups include, but are not limited to, methyl, ethyl, n-propyl, isopropyl, n-butyl, isobutyl, sec-butyl, tert-butyl, n-pentyl, sec-pentyl, iso-pentyl, neopentyl, n-hexyl, sec-hexyl, n-heptyl, n-octyl, n-decyl, n-undecyl, dodecyl, cyclohexyl, (cyclohexyl)methyl, cyclopropylmethyl, and homologs and isomers thereof.

"Branched" refers to an alkyl group in which a lower alkyl group, such as methyl, ethyl or propyl, is attached to a linear alkyl chain. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. "Higher alkyl" refers to an alkyl group having about 10 to about 20 carbon atoms, e.g., 10, 11, 12, 13, 14, 15, 16, 17, 18, 19, or 20 carbon atoms. In certain embodiments, "alkyl" refers, in particular, to $C_{1-8}$ straight-chain alkyls. In other embodiments, "alkyl" refers, in particular, to $C_{1-8}$ branched-chain alkyls.

Alkyl groups can optionally be substituted (a "substituted alkyl") with one or more alkyl group substituents, which can be the same or different. The term "alkyl group substituent" includes but is not limited to alkyl, substituted alkyl, halo, arylamino, acyl, hydroxyl, aryloxyl, alkoxyl, alkylthio, arylthio, aralkyloxyl, aralkylthio, carboxyl, alkoxycarbonyl, oxo, and cycloalkyl. There can be optionally inserted along the alkyl chain one or more oxygen, sulfur or substituted or unsubstituted nitrogen atoms, wherein the nitrogen substituent is hydrogen, lower alkyl (also referred to herein as "alkylaminoalkyl"), or aryl.

Thus, as used herein, the term "substituted alkyl" includes alkyl groups, as defined herein, in which one or more atoms or functional groups of the alkyl group are replaced with another atom or functional group, including for example, alkyl, substituted alkyl, halogen, aryl, substituted aryl, alkoxyl, hydroxyl, nitro, amino, alkylamino, dialkylamino, sulfate, and mercapto.

The term "heteroalkyl," by itself or in combination with another term, means, unless otherwise stated, a stable straight or branched chain, or cyclic hydrocarbon group, or combinations thereof, consisting of at least one carbon atoms and at least one heteroatom selected from the group consisting of O, N, P, Si and S, and wherein the nitrogen, phosphorus, and sulfur atoms may optionally be oxidized and the nitrogen heteroatom may optionally be quaternized. The heteroatom(s) O, N, P and S and Si may be placed at any interior position of the heteroalkyl group or at the position at which alkyl group is attached to the remainder of the molecule. Examples include, but are not limited to, —CH$_2$—CH$_2$—O—CH$_3$, —CH$_2$—CH$_2$—NH—CH$_3$, —CH$_2$—CH$_2$—N(CH$_3$)—CH$_3$, —CH$_2$—S—CH$_2$—CH$_3$, —CH$_2$—CH$_{25}$—S(O)—CH$_3$, —CH$_2$—CH$_2$—S(O)$_2$—

$CH_3$, —CH=CH—O—$CH_3$, —Si$(CH_3)_3$, —$CH_2$—CH=N—$OCH_3$, —CH=CH—N$(CH_3)$—$CH_3$, O—$CH_3$, —O—$CH_2$—$CH_3$, and —CN. Up to two or three heteroatoms may be consecutive, such as, for example, —$CH_2$—NH—$OCH_3$ and —$CH_2$—O—Si$(CH_3)_3$.

As described above, heteroalkyl groups, as used herein, include those groups that are attached to the remainder of the molecule through a heteroatom, such as —C(O)R', —C(O)NR', —NR'R", —OR', —SR, and/or —$SO_2$R'. Where "heteroalkyl" is recited, followed by recitations of specific heteroalkyl groups, such as —NR'R or the like, it will be understood that the terms heteroalkyl and —NR'R" are not redundant or mutually exclusive. Rather, the specific heteroalkyl groups are recited to add clarity. Thus, the term "heteroalkyl" should not be interpreted herein as excluding specific heteroalkyl groups, such as —NR'R" or the like.

"Cyclic" and "cycloalkyl" refer to a non-aromatic mono- or multicyclic ring system of about 3 to about 10 carbon atoms, e.g., 3, 4, 5, 6, 7, 8, 9, or 10 carbon atoms. The cycloalkyl group can be optionally partially unsaturated. The cycloalkyl group also can be optionally substituted with an alkyl group substituent as defined herein, oxo, and/or alkylene. There can be optionally inserted along the cyclic alkyl chain one or more oxygen, sulfur or substituted or unsubstituted nitrogen atoms, wherein the nitrogen substituent is hydrogen, alkyl, substituted alkyl, aryl, or substituted aryl, thus providing a heterocyclic group. Representative monocyclic cycloalkyl rings include cyclopentyl, cyclohexyl, and cycloheptyl. Multicyclic cycloalkyl rings include adamantyl, octahydronaphthyl, decalin, camphor, camphane, and noradamantyl, and fused ring systems, such as dihydro- and tetrahydronaphthalene, and the like.

The term "cycloalkylalkyl," as used herein, refers to a cycloalkyl group as defined hereinabove, which is attached to the parent molecular moiety through an alkyl group, also as defined above. Examples of cycloalkylalkyl groups include cyclopropylmethyl and cyclopentylethyl.

The terms "cycloheteroalkyl" or "heterocycloalkyl" refer to a non-aromatic ring system, unsaturated or partially unsaturated ring system, such as a 3- to 10-member substituted or unsubstituted cycloalkyl ring system, including one or more heteroatoms, which can be the same or different, and are selected from the group consisting of nitrogen (N), oxygen (O), sulfur (S), phosphorus (P), and silicon (Si), and optionally can include one or more double bonds.

The cycloheteroalkyl ring can be optionally fused to or otherwise attached to other cycloheteroalkyl rings and/or non-aromatic hydrocarbon rings. Heterocyclic rings include those having from one to three heteroatoms independently selected from oxygen, sulfur, and nitrogen, in which the nitrogen and sulfur heteroatoms may optionally be oxidized and the nitrogen heteroatom may optionally be quaternized. In certain embodiments, the term heterocyclic refers to a non-aromatic 5-, 6-, or 7-membered ring or a polycyclic group wherein at least one ring atom is a heteroatom selected from O, S, and N (wherein the nitrogen and sulfur heteroatoms may be optionally oxidized), including, but not limited to, a bi- or tri-cyclic group, comprising fused six-membered rings having between one and three heteroatoms independently selected from the oxygen, sulfur, and nitrogen, wherein (i) each 5-membered ring has 0 to 2 double bonds, each 6-membered ring has 0 to 2 double bonds, and each 7-membered ring has 0 to 3 double bonds, (ii) the nitrogen and sulfur heteroatoms may be optionally oxidized, (iii) the nitrogen heteroatom may optionally be quaternized, and (iv) any of the above heterocyclic rings may be fused to an aryl or heteroaryl ring. Representative cycloheteroalkyl ring systems include, but are not limited to pyrrolidinyl, pyrrolinyl, imidazolidinyl, imidazolinyl, pyrazolidinyl, pyrazolinyl, piperidyl, piperazinyl, indolinyl, quinuclidinyl, morpholinyl, thiomorpholinyl, thiadiazinanyl, tetrahydrofuranyl, and the like.

The terms "cycloalkyl" and "heterocycloalkyl", by themselves or in combination with other terms, represent, unless otherwise stated, cyclic versions of "alkyl" and "heteroalkyl", respectively. Additionally, for heterocycloalkyl, a heteroatom can occupy the position at which the heterocycle is attached to the remainder of the molecule. Examples of cycloalkyl include, but are not limited to, cyclopentyl, cyclohexyl, 1-cyclohexenyl, 3-cyclohexenyl, cycloheptyl, and the like. Examples of heterocycloalkyl include, but are not limited to, 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, 1-piperazinyl, 2-piperazinyl, and the like. The terms "cycloalkylene" and "heterocycloalkylene" refer to the divalent derivatives of cycloalkyl and heterocycloalkyl, respectively.

An unsaturated alkyl group is one having one or more double bonds or triple bonds. Examples of unsaturated alkyl groups include, but are not limited to, vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers. Alkyl groups which are limited to hydrocarbon groups are termed "homoalkyl."

More particularly, the term "alkenyl" as used herein refers to a monovalent group derived from a $C_{1-20}$ inclusive straight or branched hydrocarbon moiety having at least one carbon-carbon double bond by the removal of a single hydrogen atom. Alkenyl groups include, for example, ethenyl (i.e., vinyl), propenyl, butenyl, 1-methyl-2-buten-1-yl, pentenyl, hexenyl, octenyl, and butadienyl.

The term "cycloalkenyl" as used herein refers to a cyclic hydrocarbon containing at least one carbon-carbon double bond. Examples of cycloalkenyl groups include cyclopropenyl, cyclobutenyl, cyclopentenyl, cyclopentadiene, cyclohexenyl, 1,3-cyclohexadiene, cycloheptenyl, cycloheptatrienyl, and cyclooctenyl.

The term "alkynyl" as used herein refers to a monovalent group derived from a straight or branched $C_{1-20}$ hydrocarbon of a designed number of carbon atoms containing at least one carbon-carbon triple bond. Examples of "alkynyl" include ethynyl, 2-propynyl (propargyl), 1-propynyl, pentynyl, hexynyl, heptynyl, and allenyl groups, and the like.

The term "alkylene" by itself or a part of another substituent refers to a straight or branched bivalent aliphatic hydrocarbon group derived from an alkyl group having from 1 to about 20 carbon atoms, e.g., 1, 2, 3, 4, 5, 6, 7, 8, 9, 10, 11, 12, 13, 14, 15, 16, 17, 18, 19, or 20 carbon atoms. The alkylene group can be straight, branched or cyclic. The alkylene group also can be optionally unsaturated and/or substituted with one or more "alkyl group substituents." There can be optionally inserted along the alkylene group one or more oxygen, sulfur or substituted or unsubstituted nitrogen atoms (also referred to herein as "alkylaminoalkyl"), wherein the nitrogen substituent is alkyl as previously described. Exemplary alkylene groups include methylene (—$CH_2$—); ethylene (—$CH_2$—$CH_2$—); propylene (—$(CH_2)_3$—); cyclohexylene (—$C_6H_{10}$); —CH=CH—CH=CH—; —CH=CH—$CH_2$—; —$CH_2CH_2CH_2CH_2$—, —$CH_2$CH=CH$CH_2$—, —$CH_2$CsCC$H_2$—, —$CH_2CH_2$CH($CH_2CH_2CH_3$)$CH_2$—, —$(CH_2)_q$—N(R)—$(CH_2)_r$—, wherein each of q and r is independently an integer from 0 to about 20, e.g., 0, 1, 2, 3, 4, 5, 6, 7, 8, 9, 10, 11, 12, 13, 14, 15, 16, 17, 18, 19, or 20, and R is hydrogen or lower alkyl; methylenedioxyl (—O—CH$_2$—O—); and ethylenedioxyl (—O—(CH$_2$)$_2$—O—). An alkylene group can have about 2 to about 3 carbon atoms and can further have 6-20 carbons. Typically, an alkyl (or alkylene) group will have from 1 to 24 carbon atoms, with those groups having 10 or fewer carbon atoms being some embodiments of the present disclosure. A "lower alkyl" or "lower alkylene" is a shorter chain alkyl or alkylene group, generally having eight or fewer carbon atoms.

The term "heteroalkylene" by itself or as part of another substituent means a divalent group derived from heteroalkyl, as exemplified, but not limited by, —CH$_2$—CH$_2$—S—CH$_2$—CH$_2$— and —CH$_2$—S—CH$_2$—CH$_2$—NH—CH$_2$—. For heteroalkylene groups, heteroatoms can also occupy either or both of the chain termini (e.g., alkyleneoxo, alkylenedioxo, alkyleneamino, alkylenediamino, and the like). Still further, for alkylene and heteroalkylene linking groups, no orientation of the linking group is implied by the direction in which the formula of the linking group is written. For example, the formula —C(O)OR'— represents both —C(O)OR'— and —R'OC(O)—.

The term "aryl" means, unless otherwise stated, an aromatic hydrocarbon substituent that can be a single ring or multiple rings (such as from 1 to 3 rings), which are fused together or linked covalently. The term "heteroaryl" refers to aryl groups (or rings) that contain from one to four heteroatoms (in each separate ring in the case of multiple rings) selected from N, O, and S, wherein the nitrogen and sulfur atoms are optionally oxidized, and the nitrogen atom(s) are optionally quaternized. A heteroaryl group can be attached to the remainder of the molecule through a carbon or heteroatom. Non-limiting examples of aryl and heteroaryl groups include phenyl, 1-naphthyl, 2-naphthyl, 4-biphenyl, 1-pyrrolyl, 2-pyrrolyl, 3-pyrrolyl, 3-pyrazolyl, 2-imidazolyl, 4-imidazolyl, pyrazinyl, 2-oxazolyl, 4-oxazolyl, 2-phenyl-4-oxazolyl, 5-oxazolyl, 3-isoxazolyl, 4-isoxazolyl, 5-isoxazolyl, 2-thiazolyl, 4-thiazolyl, 5-thiazolyl, 2-furyl, 3-furyl, 2-thienyl, 3-thienyl, 2-pyridyl, 3-pyridyl, 4-pyridyl, 2-pyrimidyl, 4-pyrimidyl, 5-benzothiazolyl, purinyl, 2-benzimidazolyl, 5-indolyl, 1-isoquinolyl, 5-isoquinolyl, 2-quinoxalinyl, 5-quinoxalinyl, 3-quinolyl, and 6-quinolyl. Substituents for each of above noted aryl and heteroaryl ring systems are selected from the group of acceptable substituents described below. The terms "arylene" and "heteroarylene" refer to the divalent forms of aryl and heteroaryl, respectively.

For brevity, the term "aryl" when used in combination with other terms (e.g., aryloxo, arylthioxo, arylalkyl) includes both aryl and heteroaryl rings as defined above. Thus, the terms "arylalkyl" and "heteroarylalkyl" are meant to include those groups in which an aryl or heteroaryl group is attached to an alkyl group (e.g., benzyl, phenethyl, pyridylmethyl, furylmethyl, and the like) including those alkyl groups in which a carbon atom (e.g., a methylene group) has been replaced by, for example, an oxygen atom (e.g., phenoxymethyl, 2-pyridyloxymethyl, 3-(1-naphthyloxy)propyl, and the like). However, the term "haloaryl," as used herein is meant to cover only aryls substituted with one or more halogens.

Where a heteroalkyl, heterocycloalkyl, or heteroaryl includes a specific number of members (e.g. "3 to 7 membered"), the term "member" refers to a carbon or heteroatom.

Further, a structure represented generally by the formula:

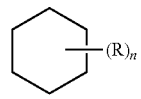

as used herein refers to a ring structure, for example, but not limited to a 3-carbon, a 4-carbon, a 5-carbon, a 6-carbon, a 7-carbon, and the like, aliphatic and/or aromatic cyclic compound, including a saturated ring structure, a partially saturated ring structure, and an unsaturated ring structure, comprising a substituent R group, wherein the R group can be present or absent, and when present, one or more R groups can each be substituted on one or more available carbon atoms of the ring structure. The presence or absence of the R group and number of R groups is determined by the value of the variable "n," which is an integer generally having a value ranging from 0 to the number of carbon atoms on the ring available for substitution. Each R group, if more than one, is substituted on an available carbon of the ring structure rather than on another R group. For example, the structure above where n is 0 to 2 would comprise compound groups including, but not limited to:

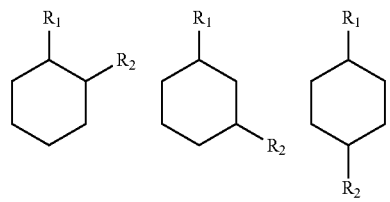

and the like.

A dashed line representing a bond in a cyclic ring structure indicates that the bond can be either present or absent in the ring. That is, a dashed line representing a bond in a cyclic ring structure indicates that the ring structure is selected from the group consisting of a saturated ring structure, a partially saturated ring structure, and an unsaturated ring structure.

The symbol ( $\sim\!\sim\!\sim\!\sim$ ) denotes the point of attachment of a moiety to the remainder of the molecule.

When a named atom of an aromatic ring or a heterocyclic aromatic ring is defined as being "absent," the named atom is replaced by a direct bond.

Each of above terms (e.g., "alkyl," "heteroalkyl," "cycloalkyl, and "heterocycloalkyl", "aryl," "heteroaryl," "phosphonate," and "sulfonate" as well as their divalent derivatives) are meant to include both substituted and unsubstituted forms of the indicated group. Optional substituents for each type of group are provided below.

Substituents for alkyl, heteroalkyl, cycloalkyl, heterocycloalkyl monovalent and divalent derivative groups (including those groups often referred to as alkylene, alkenyl, heteroalkylene, heteroalkenyl, alkynyl, cycloalkyl, heterocycloalkyl, cycloalkenyl, and heterocycloalkenyl) can be one or more of a variety of groups selected from, but not limited to: —OR', =O, =NR', =N—OR', —NR'R", —SR', -halogen, —SiR'R"R'", —OC(O)R', —C(O)R', —CO$_2$R', —C(O)NR'R", —OC(O)NR'R", —NR"C(O)R', —NR'—C(O)NR"R'", —NR"C(O)OR', —NR—C(NR'R")=NR'", —S(O)R', —S(O)$_2$R', —S(O)$_2$NR'R", —NRSO$_2$R', —CN and —NO$_2$ in a number ranging from zero to (2m'+1), where m' is the total number of carbon atoms in such groups. R', R", R'" and R"" each may independently refer to hydrogen, substituted or unsubstituted heteroalkyl, substituted or unsubstituted cycloalkyl, substituted or unsubstituted heterocycloalkyl, substituted or unsubstituted aryl (e.g., aryl substituted with 1-3 halogens), substituted or unsubstituted alkyl, alkoxy or thioalkoxy groups, or arylalkyl groups. As used herein, an "alkoxy" group is an alkyl attached to the remainder of the molecule through a divalent oxygen. When a compound of the disclosure includes more than one R group, for example, each of the R groups is independently selected as are each R', R", R'" and R"" groups when more than one of these groups is present. When R' and R" are attached to the same nitrogen atom, they can be combined with the nitrogen atom to form a 4-, 5-, 6-, or 7-membered ring. For example, —NR'R" is meant to include, but not be limited to, 1-pyrrolidinyl and 4-morpholinyl. From the above discussion of substituents, one of skill in the art will understand that the term "alkyl" is meant to include groups including carbon atoms bound to groups other than hydrogen groups, such as haloalkyl (e.g., —CF$_3$ and —CH$_2$CF$_3$) and acyl (e.g., —C(O)CH$_3$, —C(O)CF$_3$, —C(O)CH$_2$OCH$_3$, and the like).

Similar to the substituents described for alkyl groups above, exemplary substituents for aryl and heteroaryl groups (as well as their divalent derivatives) are varied and are selected from, for example: halogen, —OR', —NR'R", —SR', -halogen, —SiR'R"R'", —OC(O)R', —C(O)R', —CO$_2$R', —C(O)NR'R", —OC(O)NR'R", —NR"C(O)R', —NR'—C(O)NR"R'", —NR"C(O)OR', —NR—C(NR'R"R'")=NR"", —NR—C(NR'R")=NR'"—S(O)R', —S(O)$_2$R', —S(O)$_2$NR'R", —NRSO$_2$R', —CN and —NO$_2$, —R', —N$_3$, —CH(Ph)$_2$, fluoro(C$_1$-C$_4$)alkoxo, and fluoro (C$_1$-C$_4$)alkyl, in a number ranging from zero to the total number of open valences on aromatic ring system; and where R', R", R'" and R"" may be independently selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl and substituted or unsubstituted heteroaryl. When a compound of the disclosure includes more than one R group, for example, each of the R groups is independently selected as are each R', R", R'" and R"" groups when more than one of these groups is present.

Two of the substituents on adjacent atoms of aryl or heteroaryl ring may optionally form a ring of the formula -T-C(O)—(CRR')$_q$—U—, wherein T and U are independently —NR—, —O—, —CRR'— or a single bond, and q is an integer of from 0 to 3. Alternatively, two of the substituents on adjacent atoms of aryl or heteroaryl ring may optionally be replaced with a substituent of the formula -A-(CH$_2$)$_r$—B—, wherein A and B are independently —CRR'—, —O—, —NR—, —S—, —S(O)—, —S(O)$_2$—, —S(O)$_2$NR'— or a single bond, and r is an integer of from 1 to 4.

One of the single bonds of the new ring so formed may optionally be replaced with a double bond. Alternatively, two of the substituents on adjacent atoms of aryl or heteroaryl ring may optionally be replaced with a substituent of the formula —(CRR')$_s$—X'—(C"R'")$_d$—, where s and d are independently integers of from 0 to 3, and X' is —O—, —NR'—, —S—, —S(O)—, —S(O)$_2$—, or —S(O)$_2$NR'—. The substituents R, R', R" and R'" may be independently selected from hydrogen, substituted or unsubstituted alkyl, substituted or unsubstituted cycloalkyl, substituted or unsubstituted heterocycloalkyl, substituted or unsubstituted aryl, and substituted or unsubstituted heteroaryl.

As used herein, the term "acyl" refers to an organic acid group wherein the —OH of the carboxyl group has been replaced with another substituent and has the general formula RC(=O)—, wherein R is an alkyl, alkenyl, alkynyl, aryl, carbocylic, heterocyclic, or aromatic heterocyclic group as defined herein). As such, the term "acyl" specifically includes arylacyl groups, such as an acetylfuran and a phenacyl group. Specific examples of acyl groups include acetyl and benzoyl.

The terms "alkoxyl" or "alkoxy" are used interchangeably herein and refer to a saturated (i.e., alkyl-O—) or unsaturated (i.e., alkenyl-O— and alkynyl-O—) group attached to the parent molecular moiety through an oxygen atom, wherein the terms "alkyl," "alkenyl," and "alkynyl" are as previously described and can include C$_{1-20}$ inclusive, linear, branched, or cyclic, saturated or unsaturated oxo-hydrocarbon chains, including, for example, methoxyl, ethoxyl, propoxyl, isopropoxyl, n-butoxyl, sec-butoxyl, t-butoxyl, and n-pentoxyl, neopentoxyl, n-hexoxyl, and the like.

The term "alkoxyalkyl" as used herein refers to an alkyl-O-alkyl ether, for example, a methoxyethyl or an ethoxymethyl group.

"Aryloxyl" refers to an aryl-O— group wherein the aryl group is as previously described, including a substituted aryl. The term "aryloxyl" as used herein can refer to phenyloxyl or hexyloxyl, and alkyl, substituted alkyl, halo, or alkoxyl substituted phenyloxyl or hexyloxyl.

"Aralkyl" refers to an aryl-alkyl-group wherein aryl and alkyl are as previously described, and included substituted aryl and substituted alkyl. Exemplary aralkyl groups include benzyl, phenylethyl, and naphthylmethyl.

"Aralkyloxyl" refers to an aralkyl-O— group wherein the aralkyl group is as previously described. An exemplary aralkyloxyl group is benzyloxyl.

"Alkoxycarbonyl" refers to an alkyl-O—CO— group. Exemplary alkoxycarbonyl groups include methoxycarbonyl, ethoxycarbonyl, butyloxycarbonyl, and t-butyloxycarbonyl.

"Aryloxycarbonyl" refers to an aryl-O—CO— group. Exemplary aryloxycarbonyl groups include phenoxy- and naphthoxy-carbonyl.

"Aralkoxycarbonyl" refers to an aralkyl-O—CO— group. An exemplary aralkoxycarbonyl group is benzyloxycarbonyl.

"Carbamoyl" refers to an amide group of the formula —CONH$_2$. "Alkylcarbamoyl" refers to a R'RN—CO— group wherein one of R and R' is hydrogen and the other of R and R' is alkyl and/or substituted alkyl as previously described. "Dialkylcarbamoyl" refers to a R'RN—CO— group wherein each of R and R' is independently alkyl and/or substituted alkyl as previously described.

The term carbonyldioxyl, as used herein, refers to a carbonate group of the formula —O—CO—OR.

"Acyloxyl" refers to an acyl-O— group wherein acyl is as previously described.

The term "amino" refers to the —NH$_2$ group and also refers to a nitrogen containing group as is known in the art derived from ammonia by the replacement of one or more hydrogen radicals by organic radicals. For example, the terms "acylamino" and "alkylamino" refer to specific N-substituted organic radicals with acyl and alkyl substituent groups respectively.

An "aminoalkyl" as used herein refers to an amino group covalently bound to an alkylene linker. More particularly, the terms alkylamino, dialkylamino, and trialkylamino as used herein refer to one, two, or three, respectively, alkyl groups, as previously defined, attached to the parent molecular moiety through a nitrogen atom. The term alkylamino refers to a group having the structure —NHR' wherein R' is an alkyl group, as previously defined; whereas the term dialkylamino refers to a group having the structure —NR'R", wherein R' and R" are each independently selected from the group consisting of alkyl groups. The term trialkylamino refers to a group having the structure —NR'R"R"', wherein R', R", and R"' are each independently selected from the group consisting of alkyl groups. Additionally, R', R", and/or R"' taken together may optionally be —(CH$_2$)$_k$— where k is an integer from 2 to 6. Examples include, but are not limited to, methylamino, dimethylamino, ethylamino, diethylamino, diethylaminocarbonyl, methylethylamino, iso-propylamino, piperidino, trimethylamino, and propylamino.

The amino group is —NR'R", wherein R' and R" are typically selected from hydrogen, substituted or unsubstituted alkyl, substituted or unsubstituted heteroalkyl, substituted or unsubstituted cycloalkyl, substituted or unsubstituted heterocycloalkyl, substituted or unsubstituted aryl, or substituted or unsubstituted heteroaryl.

The terms alkylthioether and thioalkoxyl refer to a saturated (i.e., alkyl-S—) or unsaturated (i.e., alkenyl-S— and alkynyl-S—) group attached to the parent molecular moiety through a sulfur atom. Examples of thioalkoxyl moieties include, but are not limited to, methylthio, ethylthio, propylthio, isopropylthio, n-butylthio, and the like.

"Acylamino" refers to an acyl-NH— group wherein acyl is as previously described. "Aroylamino" refers to an aroyl-NH— group wherein aroyl is as previously described.

The term "carbonyl" refers to the —(C═O)— group.

The term "carboxyl" refers to the —COOH group. Such groups also are referred to herein as a "carboxylic acid" moiety.

The terms "halo," "halide," or "halogen" as used herein refer to fluoro, chloro, bromo, and iodo groups. Additionally, terms such as "haloalkyl," are meant to include monohaloalkyl and polyhaloalkyl. For example, the term "halo(C$_1$-C$_4$)alkyl" is mean to include, but not be limited to, trifluoromethyl, 2,2,2-trifluoroethyl, 4-chlorobutyl, 3-bromopropyl, and the like.

The term "hydroxyl" refers to the —OH group.

The term "hydroxyalkyl" refers to an alkyl group substituted with an —OH group.

The term "mercapto" refers to the —SH group.

The term "oxo" as used herein means an oxygen atom that is double bonded to a carbon atom or to another element.

The term "nitro" refers to the —NO$_2$ group.

The term "thio" refers to a compound described previously herein wherein a carbon or oxygen atom is replaced by a sulfur atom.

The term "sulfate" refers to the —SO$_4$ group.

The term thiohydroxyl or thiol, as used herein, refers to —SH.

The term ureido refers to a urea group of the formula —NH—CO—NH$_2$.

Unless otherwise explicitly defined, a "substituent group," as used herein, includes a functional group selected from one or more of the following moieties, which are defined herein:

(A) —OH, —NH$_2$, —SH, —CN, —CF$_3$, —NO$_2$, oxo, halogen, unsubstituted alkyl, unsubstituted heteroalkyl, unsubstituted cycloalkyl, unsubstituted heterocycloalkyl, unsubstituted aryl, unsubstituted heteroaryl, and (B) alkyl, heteroalkyl, cycloalkyl, heterocycloalkyl, aryl, and heteroaryl, substituted with at least one substituent selected from:
(i) oxo, —OH, —NH$_2$, —SH, —CN, —CF$_3$, —NO$_2$, halogen, unsubstituted alkyl, unsubstituted heteroalkyl, unsubstituted cycloalkyl, unsubstituted heterocycloalkyl, unsubstituted aryl, unsubstituted heteroaryl, and
(ii) alkyl, heteroalkyl, cycloalkyl, heterocycloalkyl, aryl, and heteroaryl, substituted with at least one substituent selected from:
(a) oxo, —OH, —NH$_2$, —SH, —CN, —CF$_3$, —NO$_2$, halogen, unsubstituted alkyl, unsubstituted heteroalkyl, unsubstituted cycloalkyl, unsubstituted heterocycloalkyl, unsubstituted aryl, unsubstituted heteroaryl, and
(b) alkyl, heteroalkyl, cycloalkyl, heterocycloalkyl, aryl, or heteroaryl, substituted with at least one substituent selected from oxo, —OH, —NH$_2$, —SH, —CN, —CF$_3$, —NO$_2$, halogen, unsubstituted alkyl, unsubstituted heteroalkyl, unsubstituted cycloalkyl, unsubstituted heterocycloalkyl, unsubstituted aryl, and unsubstituted heteroaryl.

A "lower substituent" or "lower substituent group," as used herein means a group selected from all of the substituents described hereinabove for a "substituent group," wherein each substituted or unsubstituted alkyl is a substituted or unsubstituted C$_1$-C$_8$ alkyl, each substituted or unsubstituted heteroalkyl is a substituted or unsubstituted 2 to 8 membered heteroalkyl, each substituted or unsubstituted cycloalkyl is a substituted or unsubstituted C$_5$-C$_7$ cycloalkyl, and each substituted or unsubstituted heterocycloalkyl is a substituted or unsubstituted 5 to 7 membered heterocycloalkyl.

A "size-limited substituent" or "size-limited substituent group," as used herein means a group selected from all of the substituents described above for a "substituent group," wherein each substituted or unsubstituted alkyl is a substituted or unsubstituted C$_1$-C$_{20}$ alkyl, each substituted or unsubstituted heteroalkyl is a substituted or unsubstituted 2 to 20 membered heteroalkyl, each substituted or unsubstituted cycloalkyl is a substituted or unsubstituted C$_4$-C$_8$ cycloalkyl, and each substituted or unsubstituted heterocycloalkyl is a substituted or unsubstituted 4 to 8 membered heterocycloalkyl.

Throughout the specification and claims, a given chemical formula or name shall encompass all tautomers, congeners, and optical- and stereoisomers, as well as racemic mixtures where such isomers and mixtures exist.

Certain compounds of the present disclosure possess asymmetric carbon atoms (optical or chiral centers) or double bonds; the enantiomers, racemates, diastereomers, tautomers, geometric isomers, stereoisometric forms that may be defined, in terms of absolute stereochemistry, as (R)-or (S)- or, as (D)- or (L)- for amino acids, and individual isomers are encompassed within the scope of the present disclosure. The compounds of the present disclosure do not include those which are known in art to be too unstable to synthesize and/or isolate. The present disclosure is meant to include compounds in racemic and optically pure forms. Optically active (R)- and (S)-, or (D)- and (L)-isomers may be prepared using chiral synthons or chiral reagents, or resolved using conventional techniques. When the compounds described herein contain olefenic bonds or other centers of geometric asymmetry, and unless specified otherwise, it is intended that the compounds include both E and Z geometric isomers.

Unless otherwise stated, structures depicted herein are also meant to include all stereochemical forms of the structure; i.e., the R and S configurations for each asymmetric center. Therefore, single stereochemical isomers as well as enantiomeric and diastereomeric mixtures of the present compounds are within the scope of the disclosure.

It will be apparent to one skilled in the art that certain compounds of this disclosure may exist in tautomeric forms, all such tautomeric forms of the compounds being within the scope of the disclosure. The term "tautomer," as used herein, refers to one of two or more structural isomers which exist in equilibrium and which are readily converted from one isomeric form to another.

Unless otherwise stated, structures depicted herein are also meant to include compounds which differ only in the presence of one or more isotopically enriched atoms. For example, compounds having the present structures except for the replacement of a hydrogen by a deuterium or tritium, or the replacement of a carbon by $^{13}$C- or $^{14}$C-enriched carbon are within the scope of this disclosure.

The compounds of the present disclosure may also contain unnatural proportions of atomic isotopes at one or more of atoms that constitute such compounds. For example, the compounds may be radiolabeled with radioactive isotopes, such as for example tritium ($^3$H), iodine-125 ($^{125}$I) or carbon-14 ($^{14}$C). All isotopic variations of the compounds of the present disclosure, whether radioactive or not, are encompassed within the scope of the present disclosure.

As used herein the term "monomer" refers to a molecule that can undergo polymerization, thereby contributing constitutional units to the essential structure of a macromolecule or polymer.

A "polymer" is a molecule of high relative molecule mass, the structure of which essentially comprises the multiple repetition of unit derived from molecules of low relative molecular mass, i.e., a monomer.

As used herein, an "oligomer" includes a few monomer units, for example, in contrast to a polymer that potentially can comprise an unlimited number of monomers. Dimers, trimers, and tetramers are non-limiting examples of oligomers.

The compounds of the present disclosure may exist as salts. The present disclosure includes such salts. Examples of applicable salt forms include hydrochlorides, hydrobromides, sulfates, methanesulfonates, nitrates, maleates, acetates, citrates, fumarates, tartrates (e.g. (+)-tartrates, (−)-tartrates or mixtures thereof including racemic mixtures, succinates, benzoates and salts with amino acids such as glutamic acid. These salts may be prepared by methods known to those skilled in art. Also included are base addition salts such as sodium, potassium, calcium, ammonium, organic amino, or magnesium salt, or a similar salt. When compounds of the present disclosure contain relatively basic functionalities, acid addition salts can be obtained by contacting the neutral form of such compounds with a sufficient amount of the desired acid, either neat or in a suitable inert solvent. Examples of acceptable acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like. Certain specific compounds of the present disclosure contain both basic and acidic functionalities that allow the compounds to be converted into either base or acid addition salts.

The neutral forms of the compounds may be regenerated by contacting the salt with a base or acid and isolating the parent compound in the conventional manner. The parent form of the compound differs from the various salt forms in certain physical properties, such as solubility in polar solvents.

Certain compounds of the present disclosure can exist in unsolvated forms as well as solvated forms, including hydrated forms. In general, the solvated forms are equivalent to unsolvated forms and are encompassed within the scope of the present disclosure. Certain compounds of the present disclosure may exist in multiple crystalline or amorphous forms. In general, all physical forms are equivalent for the uses contemplated by the present disclosure and are intended to be within the scope of the present disclosure.

The term "pharmaceutically acceptable salts" is meant to include salts of active compounds which are prepared with relatively nontoxic acids or bases, depending on the particular substituent moieties found on the compounds described herein. When compounds of the present disclosure contain relatively acidic functionalities, base addition salts can be obtained by contacting the neutral form of such compounds with a sufficient amount of the desired base, either neat or in a suitable inert solvent. Examples of pharmaceutically acceptable base addition salts include sodium, potassium, calcium, ammonium, organic amino, or magnesium salt, or a similar salt. When compounds of the present disclosure contain relatively basic functionalities, acid addition salts can be obtained by contacting the neutral form of such compounds with a sufficient amount of the desired acid, either neat or in a suitable inert solvent. Examples of pharmaceutically acceptable acid addition salts include those derived from inorganic acids like hydrochloric, hydrobromic, nitric, carbonic, monohydrogencarbonic, phosphoric, monohydrogenphosphoric, dihydrogenphosphoric, sulfuric, monohydrogensulfuric, hydriodic, or phosphorous acids and the like, as well as the salts derived from relatively nontoxic organic acids like acetic, propionic, isobutyric, maleic, malonic, benzoic, succinic, suberic, fumaric, lactic, mandelic, phthalic, benzenesulfonic, p-tolylsulfonic, citric, tartaric, methanesulfonic, and the like. Also included are salts of amino acids such as arginate and the like, and salts of organic acids like glucuronic or galactunoric acids and the like {see, for example, Berge et al, "Pharmaceutical Salts", Journal of Pharmaceutical Science, 1977, 66, 1-19). Certain specific compounds of the present disclosure contain both basic and acidic functionalities that allow the compounds to be converted into either base or acid addition salts.

In addition to salt forms, the present disclosure provides compounds, which are in a prodrug form. Prodrugs of the compounds described herein are those compounds that readily undergo chemical changes under physiological conditions to provide the compounds of the present disclosure. Additionally, prodrugs can be converted to the compounds of the present disclosure by chemical or biochemical methods in an ex vivo environment. For example, prodrugs can be slowly converted to the compounds of the present disclosure when placed in a transdermal patch reservoir with a suitable enzyme or chemical reagent.

The term "protecting group" refers to chemical moieties that block some or all reactive moieties of a compound and prevent such moieties from participating in chemical reactions until the protective group is removed, for example, those moieties listed and described in T. W. Greene, P. G. M. Wuts, Protective Groups in Organic Synthesis, 3rd ed. John Wiley & Sons (1999). It may be advantageous, where different protecting groups are employed, that each (different) protective group be removable by a different means. Protective groups that are cleaved under totally disparate reaction conditions allow differential removal of such protecting groups. For example, protective groups can be removed by acid, base, and hydrogenolysis. Groups such as trityl, dimethoxytrityl, acetal and tert-butyldimethylsilyl are acid labile and may be used to protect carboxy and hydroxy reactive moieties in the presence of amino groups protected with Cbz groups, which are removable by hydrogenolysis, and Fmoc groups, which are base labile. Carboxylic acid and hydroxy reactive moieties may be blocked with base labile groups such as, without limitation, methyl, ethyl, and acetyl in the presence of amines blocked with acid labile groups such as tert-butyl carbamate or with carbamates that are both acid and base stable but hydrolytically removable.

Carboxylic acid and hydroxy reactive moieties may also be blocked with hydrolytically removable protective groups such as the benzyl group, while amine groups capable of hydrogen bonding with acids may be blocked with base labile groups such as Fmoc. Carboxylic acid reactive moieties may be blocked with oxidatively-removable protective groups such as 2,4-dimethoxybenzyl, while co-existing amino groups may be blocked with fluoride labile silyl carbamates.

Allyl blocking groups are useful in the presence of acid- and base-protecting groups since the former are stable and can be subsequently removed by metal or pi-acid catalysts. For example, an allyl-blocked carboxylic acid can be deprotected with a palladium(O)— catalyzed reaction in the presence of acid labile t-butyl carbamate or base-labile acetate amine protecting groups. Yet another form of protecting group is a resin to which a compound or intermediate may be attached. As long as the residue is attached to the resin, that functional group is blocked and cannot react. Once released from the resin, the functional group is available to react.

Typical blocking/protecting groups include, but are not limited to the following moieties:

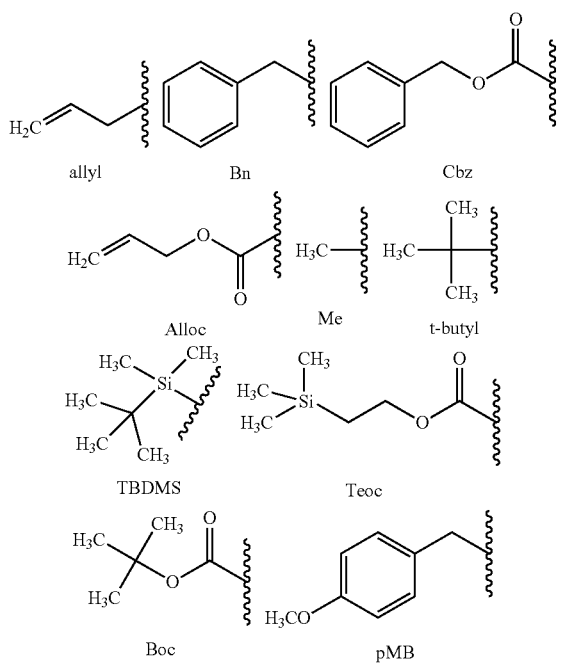

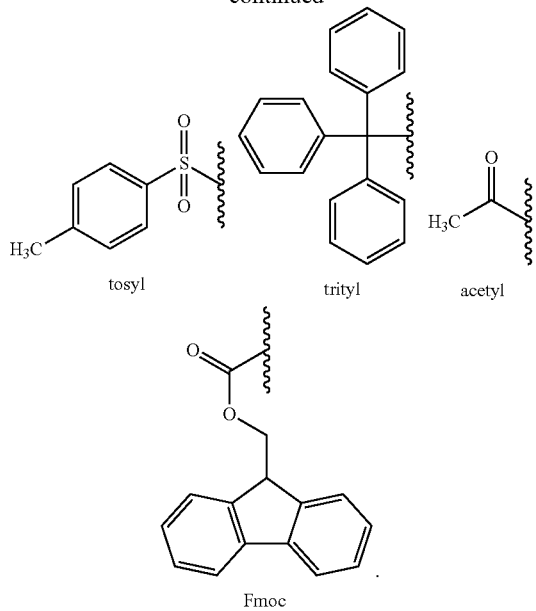

The subject treated by the presently disclosed methods in their many embodiments is desirably a human subject, although it is to be understood that the methods described herein are effective with respect to all vertebrate species, which are intended to be included in the term "subject." Accordingly, a "subject" can include a human subject for medical purposes, such as for the treatment of an existing condition or disease or the prophylactic treatment for preventing the onset of a condition or disease, or an animal subject for medical, veterinary purposes, or developmental purposes. Suitable animal subjects include mammals including, but not limited to, primates, e.g., humans, monkeys, apes, and the like; bovines, e.g., cattle, oxen, and the like; ovines, e.g., sheep and the like; caprines, e.g., goats and the like; porcines, e.g., pigs, hogs, and the like; equines, e.g., horses, donkeys, zebras, and the like; felines, including wild and domestic cats; canines, including dogs; lagomorphs, including rabbits, hares, and the like; and rodents, including mice, rats, and the like. An animal may be a transgenic animal. In some embodiments, the subject is a human including, but not limited to, fetal, neonatal, infant, juvenile, and adult subjects. Further, a "subject" can include a patient afflicted with or suspected of being afflicted with a condition or disease. Thus, the terms "subject" and "patient" are used interchangeably herein.

In general, the "effective amount" of an active agent or drug delivery device refers to the amount necessary to elicit the desired biological response. As will be appreciated by those of ordinary skill in this art, the effective amount of an agent or device may vary depending on such factors as the desired biological endpoint, the agent to be delivered, the composition of the encapsulating matrix, the target tissue, and the like.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The synthetic descriptions and specific examples that follow are only intended for the purposes of illustration, and are not to be construed as limiting in any manner to make compounds of the disclosure by other methods.

Example 1

Methods

Comparative Tissue Distribution of 2-PMPA Prodrugs Versus Equimolar 2-PMPA in Nude Mice or C4-2 Prostate Cancer Tumor-Bearing NSG Mice.

Nude mice were administered either 2-PMPA or the prodrugs LTP-144 or Tris-POC-2-PMPA (compound 10 of Table 1) (5 mg/kg or molar equivalent, i.p.) prior to brief isoflurane anesthesia, saline perfusion, and sacrificed 30 minutes later. Kidneys were removed and flash frozen in liquid nitrogen. Each tissue sample was assessed for 2-PMPA concentration using previously described LC/MS-MS based bioanalysis (Majer et al., 2016). In addition, a prodrug of the urea-based PSMA ligand ZJ-43 (with similar pro-moiety modifications to Tris-POC-2-PMPA) was tested using similar methods.

To generate a C4-2 in vivo model, $3 \times 10^6$ LNCaP-C4-2 cells were subcutaneously injected into the flanks of male NSG mice. When tumors grew to approximately 600-800 $mm^3$, tumors were excised, aseptically cut into 2-mm×2-mm pieces and frozen back viably (5% DMSO/95% FBS). Tumors were not passaged from mouse to mouse more than 4 times. For the current experiment, two vials of viably frozen explants were thawed at 37° C. Tumor explants were washed in RPMI without FCS and then surgically implanted in a subcutaneous pocket in male NSG mice. When tumors reached 600-800 $mm^3$, mice were euthanized, tumors excised aseptically, and cut into 2-mm×2-mm pieces prior to re-implantation into 40 mice. When tumors reached 500-700 $mm^3$, the pharmacokinetic experiment was performed. 2-PMPA (3 mg/kg, i.v.) or a molar equivalent of Tris-POC-2-PMPA (7.62 mg/kg, i.v.) were injected via tail vein after dissolution in vehicle (5% EtOH/10% Tween 80/85% 50 mM HEPES). Mice were then euthanized under isoflurane anesthesia 0.25, 0.5, 1, 3, or 6 hours later (n=3/group). Blood was collected by cardiac puncture into EDTA-lined tubes and stored on ice until plasma was isolated by centrifugation. Salivary glands, kidneys, and tumor were harvested and flash frozen on dry ice. All tissues were stored at −80° C. prior to bioanalysis.

Displacement Study in Non-Tumor-Bearing NMRI Mice $^{68}$Ga-PSMA-617 was synthesized as described previously (Afshar-Oromieh et al., 2015). The specific activity of the radiopharmaceutical used in the presented animal study (20 MBq of $^{68}$Ga tagged to 0.2-0.8 µg of precursor peptide) corresponds to the one used in clinical application (Afshar-Oromieh et al., 2015). Three non-tumor-bearing NMRI mice were injected via the tail vein with 20 MBq of $^{68}$Ga-PSMA-617. 1 h post injection, enough time for specific tracer binding to renal PSMA and clearance of unbound tracer from the kidney calices, mice were imaged in a dedicated small animal PET-scanner (Siemens, Inveon) to quantify kidney uptake (baseline-scan). Immediately after the baseline scan 16 µg Tris-POC-2-PMPA (0.5 mg/kg*32.1 g bodyweight (BW) of all mice) in 100 µL saline was injected via the tail vein. Another 1 h later, i.e., 2 h after injection of the PET-tracer, $^{68}$Ga-PSMA-617 kidney uptake was re-evaluated per animal PET (displacement-scan).

Displacement Study in LNCaP Tumor Xenograft Bearing Nude Mice $5*10^6$ LNCaP cells (BD Biosciences) were implanted behind the left shoulder of n=3 nude mice; tumors reached a diameter of approximately 1-cm diameter 8-12 weeks after inoculation. Baseline uptake of the radiopharmaceutical in kidneys and tumor was quantified per animal PET-scan (Siemens, Inveon) 1 h after injection of $^{68}$Ga-PSMA-617 (10-40 MBq $^{68}$Ga tagged to 0.4 g PSMA-617 precursor). Immediately after the baseline scan animals were injected with 0.5 mg/kgBW or 0.05 mg/kgBW Tris-POC-2-PMPA in 100 µg saline or pure saline as control. Another 1 h later, i.e., 2 h after injection of the PET-tracer, $^{68}$Ga-PSMA-617 uptake in kidneys and tumor were re-evaluated per second animal PET (displacement scan).

Kidney and Salivary Gland Uptake in Healthy Human Subjects Examined with $^{68}$Ga-PSMA-617 with and without Tris-POC-2-PMPA Pre-Dosing From a couple of patients who had been imaged (Siemens, mCT) 0.1 h, 1 h, 2 h, 3 h and 4 h after injection of $^{68}$Ga-PSMA-617 previously (Afshar-Oromieh et al., 2015), one subject without relevant tumor-load (<5 mL) was chosen to quantify the physiologic spontaneous tracer uptake in kidneys and salivary gland during the examination time. For the intervention experiment, one healthy volunteer was injected with 5 mg (0.05 mg/kgBW) Tris-POC-2-PMPA solution (in 2.5 mL of 30% ethanol) 15 min before application of the PET-tracer. Again, PET-scans (Siemens, mCT) were performed 0.1 h, 1 h, 2 h, 3 h and 4 h after injection of $^{68}$Ga-PSMA-617 and quantified per SUVmax for tracer uptake in kidneys and salivary glands over time.

Tumor, Kidney and Salivary Gland Uptake in a Prostate Cancer Patient Examined with $^{68}$Ga-PSMA-617 with and without Tris-POC-2-PMPA Pre-Dosing One patient was PET imaged 1 h after injection of $^{68}$Ga-PSMA-617 and quantified per SUVmax for tracer uptake in tumor, kidneys and salivary glands. On a subsequent day, the same patient was imaged using the same protocol but with pretreatment of 10 mg (0.1 mg/kgBW) Tris-POC-2-PMPA solution (in 2.5 mL of 30% ethanol) 15 min before application of the PET-tracer.

Tumor, Kidney and Salivary Gland Uptake in a Prostate Cancer Patient Treated and Imaged with $^{177}$Lu-PSMA-617 with and without Tris-POC-2-PMPA Pre-Dosing $^{177}$Lu-PSMA-617 was offered as surrogate therapy in accordance with the updated Declaration of Helsinki, paragraph-37 "Unproven Interventions in Clinical Practice," and in accordance with German regulations for "compassionate use," which includes priority of all approved treatments (without contraindications) and confirmation of the indication by both a nuclear medicine physician and an external expert in urology or oncology. No systematic patient selection was performed, except all patients had to present with a PSMA-positive tumor phenotype based on PSMA imaging. All patients were informed about the experimental nature of this therapy and gave written informed consent. The institutional review board approved this retrospective study. Two patients were pre-treated with Tris-POC-2-PMPA prior to administration of $^{177}$Lu-PSMA-617. Gamma ray imaging was then conducted over several hours and radiation dosimetry estimates were calculated for healthy organs as well as metastatic lesions and compared to historical controls that did not receive Tris-POC-2-PMPA pre-treatment. Dosimetry data from historical controls presented herein are derived from patients treated under the same protocol at our center as previously reported (J Nucl Med. 2016 August; 57(8):1170-6.). All dosimetry methods were conducted as previously described in that report (J Nucl Med. 2016 August; 57(8):1170-6.).

Example 2

Results

First, the prodrug Tris-POC-2-PMPA was shown to deliver high levels of 2-PMPA to kidney in a pharmacokinetic/tissue distribution study in mice. Second, in prostate cancer tumor-bearing mice, Tris-POC-2-PMPA exhibited 3- and 57-fold preferential delivery of 2-PMPA to rodent salivary glands and kidneys, respectively, versus prostate cancer xenograft. Tris-POC-2-PMPA was shown to significantly reduce kidney uptake of the PSMA-targeted PET tracer $^{68}$Ga-PSMA-617 in normal mice. When tested in mice bearing a prostate cancer tumor, Tris-POC-2-PMPA selectively reduced the kidney uptake of $^{68}$Ga-PSMA-617, but completely spared the tumor uptake. In a pilot experiment in a healthy human male, pre-treatment with Tris-POC-2-PMPA performed similarly to mice. Pre-administration of Tris-POC-2-PMPA displaced subsequent $^{68}$Ga-PSMA-617 binding to kidney and salivary glands by approximately 65%. By intraindividual comparison in a prostate cancer patient, pre-administration of Tris-POC-2-PMPA displaced subsequent $^{68}$Ga-PSMA-617 binding to kidney by over 75% and to salivary glands by over 35%, but completely spared tumor uptake of the tracer. Tris-POC-2-PMPA was subsequently administered to two prostate cancer patients prior to infusion of $^{177}$Lu-PSMA-617 for radiotherapy. Tris-POC-2-PMPA shielded both the salivary glands (72% dose reduction) and kidneys (45% dose reduction) without significant effect on radiotherapeutic exposure in prostate cancer tumors relative to historical controls. Together, these data suggest that Tris-POC-2-PMPA or similar prodrugs could selectively protect healthy organs (e.g., kidney, lacrimal glands, and salivary glands) from radioligand binding, while not interfering with tumor uptake of radioligands during PSMA-targeted imaging or radiotherapy.

Comparative Tissue Distribution of 2-PMPA Prodrugs Versus Equimolar 2-PMPA in Nude Mice Compared to an equimolar dose of 2-PMPA, LTP144 and Tris-POC-2-PMPA resulted in significantly increased concentrations of 2-PMPA in the kidney. Tris-POC-2-PMPA showed the most favorable distribution, resulting in greater than 20 increased delivery of 2-PMPA to the kidney (FIG. 1). In contrast to the presently disclosed prodrugs of 2-PMPA, a similar prodrug of the alternative urea-based PSMA ligand, ZJ-43, did not exhibit increased distribution to the mouse kidneys or salivary glands (FIG. 2B) relative to administration of ZJ-43 as parent (FIG. 2A).

Tris-POC-2-PMPA (Compound 10 of Table 1) Preferentially delivers 2-PMPA to Mouse Salivary Glands and Kidneys Versus Prostate Cancer Xenograft.

Concentrations of 2-PMPA in plasma, tumor, salivary glands, and kidneys were measured at multiple time points after tail vein administration of either 2-PMPA or Tris-POC-2-PMPA (3 mg/kg or molar equivalent, i.v.) to NSG mice harboring subcutaneous xenografts of human C4-2 prostate cancer cells (FIG. 3A and FIG. 3B). TRIS-POC-2-PMPA administration resulted in 2-PMPA salivary gland and kidney exposures of 17.5 h*nmol/g and 374 h*nmol/g, 3 and 57-fold greater than those observed in the tumor (FIG. 3B). When 2-PMPA was administered directly (FIG. 3A), salivary gland and kidney exposures were 1.76 h*nmol/g and 94.8 h*nmol/g, 10 and 4-fold lower than those achieved with TRIS-POC-2-PMPA delivery. TRIS-POC-2-PMPA thus afforded a substantial improvement in salivary:tumor and kidney:tumor 2-PMPA concentration ratios.

Displacement Study in Non-Tumor-Bearing NMRI Mice

Mean kidney uptake in baseline-scan was 3.4 mSUV (FIG. 4A). In the displacement-scan (FIG. 4B) the radioactivity was near totally displaced from the kidneys with a 0.3 mSUV residual uptake (<10% of baseline-uptake).

Displacement Study in LNCaP Tumor Xenograft Bearing Nude Mice

In the baseline-scans the mean tumor-uptake was mSUV 1.02, the mean kidney uptake was mSUV 2.36 (FIG. 5A). In the displacement-scan (FIG. 5B) the tumor uptake was nearly unchanged with an average mSUV of 1.00 for the two pre-medicated animals, which was even slightly higher in comparison to the animal that only received saline to stimulate diuresis (mSUV 0.84). The kidney uptake after Tris-POC-2-PMPA injection was displaced to mSUV 0.24, i.e. 50% lower than achieved with in forced diuresis (control: mSUV 0.47).

Kidney and Salivary Gland Uptake in Healthy Human Subject Examined with $^{68}$Ga-PSMA-617 with and without Tris-POC-2-PMPA Pre-Dosing The physiological $^{68}$Ga-PSMA-617 biodistribution in the control patient without Tris-POC-2-PMPA pre-dosing (FIG. 6A, left; maximum intensity projection 1 h p.i.), as well as its typical pharmacokinetics in kidney (FIG. 6C) and parotid glands (FIG. 6D), was well in line with a previous publication (Afshar-Oromieh et al., 2015) and can be considered representative. The highest physiological tracer uptake can be found in kidneys and salivary glands and increases over time. Coronar thin slices through the kidneys (FIG. 6B, top) demonstrate intense tracer uptake in the renal cortex, i.e. corresponding to the PSMA expression in the proximal tubules reported in histopathological examinations.

$^{68}$Ga-PSMA-617 biodistribution in the volunteer pre-dosed with Tris-POC-2-PMPA (FIG. 6A, right; maximum intensity projection 1 h p.i.) revealed remarkable reduced kidney uptake without further tracer accumulation over time. Coronar thin slices through the kidneys (FIG. 6B, bottom) demonstrate homogenous contrastation of the whole kidney parenchyma, while tracer accumulation was only observed in kidney calices; implying clearance by transit through the whole nephron.

The maximum uptake in kidney parenchyma was decreased by 65% (SUVmax 16.5 vs. 47.5) in the Tris-POC-2-PMPA pre-dosed volunteer in comparison to the representative control. The effect was highly similar for the parotid glands (SUVmax 13.5 vs. 41.2). The observed tracer uptake of the Tris-POC-2-PMPA pre-dosed volunteer was more than one standard deviation decreased in comparison to the mean kidney/parotid uptake published by Afshar-Oromieh et al., 2015, thus the probability that the result was observed by chance is <5%.

Tumor, Kidney and Salivary Gland Uptake in a Prostate Cancer Patient Examined with $^{68}$Ga-PSMA-617 with and without Tris-POC-2-PMPA Pre-Dosing Avid uptake of PSMA radioligand in metastases (SUVmax 3.6-12.5), parotid gland (SUVmax 18.2), submandibular gland (SUVmax 23.1), and kidneys (SUVmax 35.4) was first confirmed in one patient by PET scan 1 hour after administration of $^{68}$Ga-PSMA-617 (FIG. 7, upper left). When administered 15 minutes prior to injection of $^{68}$Ga-PSMA-617 in the same patient on a subsequent day, Tris-POC-2-PMPA (10 mg, i.v.) reduced radioligand uptake in parotid gland (SUVmax 10.6), submandibular gland (SUVmax 14.6), and kidneys (SUVmax 8.5) but had no clear effect on metastases (SUVmax 3.9-8.8) (FIG. 7, upper right). Quantified as a within-subject percent change, Tris-POC-2-PMPA reduced salivary gland and kidney uptake by 37 and 76%, respectively. Only a 3% mean change was observed in metastases, with some lesions actually exhibiting increased $^{68}$Ga-PSMA-617 uptake after TRIS-POC-2-PMPA pre-treatment.

TRIS-POC-2-PMPA Pre-Treatment Attenuated Uptake of $^{177}$Lu-PSMA-617 in mCRPC Patient Salivary Glands and Kidneys but not Metastases.

Based on positive results in a diagnostic PET scan, two mCRPC patients subsequently received TRIS-POC-2-PMPA (10 mg, i.v.) 15 minutes prior to infusion with $^{177}$Lu-PSMA-617 (representative patient in FIG. 8 top, dividing line separates diagnostic scan on left, therapeutic scans on right; summary data in Table below). Relative to historical controls from the same center (Kratochwil, et al., 2016), TRIS-POC-2-PMPA pre-treatment reduced radiotherapeutic uptake in the parotid gland, submandibular gland, and kidneys, resulting in absorbed doses of 0.24, 0.5, and 0.38 Gy/GBq, respectively, for patient 1, and 0.46, 0.44, and 0.43 Gy/GBq, respectively, for patient 2. All of these values fall outside the standard deviation of historical controls and represent mean absorbed dose reductions of 76%, 67%, and 48% for the parotid gland, submandibular gland, and kidneys, respectively. By contrast, TRIS-POC-2-PMPA pre-treatment had little or no effect on the dose to metastases. Patient 1 exhibited a mean dose of 8.03 Gy/GBq, and patient 2 exhibited a mean dose of 13.15 Gy/GBq. Both of these values fall within the standard deviation of historical controls, and, crucially, are at or above absorbed dose values reported to result in therapeutic efficacy (Kratochwil, et al., 2016).

Although not dose-limiting, TRIS-POC-2-PMPA appeared to modestly reduce liver exposure to $^{177}$Lu-PSMA-617 while having no clear effect on spleen dose. TRIS-POC-2-PMPA also significantly reduced lacrimal gland exposure. One recent report predicted the lacrimal glands to be the first organ to reach a critical threshold after $^{177}$Lu-PSMA-617 therapy, receiving a mean effective dose of 2.82 Gy/GBq (Hohberg, et al., 2016). This value is similar to that reported in another recent study (Scarpa, et al., 2017), as well as to that obtained in the historical controls presented herein. Relative to these mean control values, TRIS-POC-2-PMPA pre-treatment resulted in a dose reduction to the lacrimal glands of about 82%.

It is important to note that healthy organ dosimetry estimates for the historical control patients used as direct comparators in this study fall very near median values previously reported for other mCRPC patients receiving therapeutic or sub-therapeutic concentrations of $^{177}$Lu-PSMA-617 (Kratochwil, et al., 2016; Hohberg, et al., 2016; Scarpa, et al., 2017; Delker, et al., 2016; Fendler, et al., 2017; Kabasakal, et al., 2015; Kabasakal, et al., 2017; Yadav, et al., 2017). Controls in the presently disclosed subject matter exhibited mean absorbed doses to the salivary glands of 1.44 Gy/GBq (reported range: 0.72-1.90 Gy/GBq), to the kidneys of 0.78 Gy/GBq (reported range: 0.53-0.99 Gy/GBq), and to the red marrow of 0.03 Gy/GBq (reported range: 0.01-0.05 Gy/GBq), and can thus be considered representative.

REFERENCES

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art. In case of a conflict between the specification and any of the incorporated references, the specification (including any amendments thereof, which may be based on an incorporated reference), shall control. Standard art-accepted meanings of terms are used herein unless indicated otherwise. Standard abbreviations for various terms are used herein.

Afshar-Oromieh A, Hetzheim H, Kratochwil C, et al. The Theranostic PSMA Ligand PSMA-617 in the Diagnosis of Prostate Cancer by PET/CT: Biodistribution in Humans, Radiation Dosimetry, and First Evaluation of Tumor Lesions. J Nucl Med. 2015 November; 56(11): 1697-705.

Afshar-Oromieh A. et al., The Rise of PSMA Ligands for Diagnosis and Therapy of Prostate Cancer. *Journal of nuclear medicine: official publication, Society of Nuclear Medicine* 57, 79s-89s (2016).

Akhtar N. H., O. Pail, A. Saran, L. Tyrell, S. T. Tagawa, Prostate-specific membrane antigen-based therapeutics. *Advances in urology* 2012, 973820 (2012).

Baum R. P. et al., 177Lu-Labeled Prostate-Specific Membrane Antigen Radioligand Therapy of Metastatic Castration-Resistant Prostate Cancer: Safety and Efficacy. *Journal of nuclear medicine: official publication, Society of Nuclear Medicine* 57, 1006-1013 (2016).

Begum N. et al., The effect of total tumor volume on the biologically effective dose of tumor and kidneys for (177)Lu-labelled PSMA peptides. *Journal of nuclear medicine: official publication, Society of Nuclear Medicine* (Feb. 1, 2018).

Beltran H. et al., New therapies for castration-resistant prostate cancer: efficacy and safety. *European urology* 60, 279-290 (2011).

Benesova M. et al., Preclinical Evaluation of a Tailor-Made DOTA-Conjugated PSMA Inhibitor with Optimized Linker Moiety for Imaging and Endoradiotherapy of Prostate Cancer. *Journal of nuclear medicine: official publication, Society of Nuclear Medicine* 56, 914-920 (2015).

Benesova M., C. A. Umbricht, R. Schibli, C. Muller, Albumin-Binding PSMA Ligands: Optimization of the Tissue Distribution Profile. *Molecular pharmaceutics* 15, 934-946 (2018).

Bodei L. et al., Long-term evaluation of renal toxicity after peptide receptor radionuclide therapy with 90Y-DOTA-TOC and 177Lu-DOTATATE: the role of associated risk factors. *European journal of nuclear medicine and molecular imaging* 35, 1847-1856 (2008).

Bouchelouche K., B. Turkbey, P. L. Choyke, PSMA PET and Radionuclide Therapy in Prostate Cancer. *Seminars in nuclear medicine* 46, 522-535 (2016).

Ceci F, Fiorentino M, Castellucci P, Fanti S. Molecular Imaging and Precision Medicine in Prostate Cancer. PET clinics 2017; 12:83-92.

Chang S. S., Overview of prostate-specific membrane antigen. *Reviews in urology* 6 Suppl 10, S13-18 (2004).

Chatalic K. L. et al., Towards Personalized Treatment of Prostate Cancer: PSMA I&T, a Promising Prostate-Specific Membrane Antigen-Targeted Theranostic Agent. *Theranostics* 6, 849-861 (2016).

de Bono J. S. et al., Prednisone plus cabazitaxel or mitoxantrone for metastatic castration-resistant prostate cancer progressing after docetaxel treatment: a randomised open-label trial. *Lancet* (London, England) 376, 1147-1154 (2010).

Delker A. et al., Dosimetry for (177)Lu-DKFZ-PSMA-617: a new radiopharmaceutical for the treatment of metastatic prostate cancer. *European journal of nuclear medicine and molecular imaging* 43, 42-51 (2016).

Donin N. M., R. E. Reiter, Why Targeting PSMA Is a Game Changer in the Management of Prostate Cancer. *Journal of nuclear medicine: official publication, Society of Nuclear Medicine* 59, 177-182 (2018).

Eiber M. et al., Prostate-Specific Membrane Antigen Ligands for Imaging and Therapy. *Journal of nuclear medicine: official publication, Society of Nuclear Medicine* 58, 67s-76s (2017).

Fakhrejahani F., R. A. Madan, W. L. Dahut, Management Options for Biochemically Recurrent Prostate Cancer. *Current treatment options in oncology* 18, 26 (2017).

Fendler W. P. et al., Preliminary experience with dosimetry, response and patient reported outcome after 177Lu-PSMA-617 therapy for metastatic castration-resistant prostate cancer. *Oncotarget* 8, 3581-3590 (2017).

Fendler W. P., K. Rahbar, K. Herrmann, C. Kratochwil, M. Eiber, (177)Lu-PSMA Radioligand Therapy for Prostate Cancer. *Journal of nuclear medicine: official publication, Society of Nuclear Medicine* 58, 1196-1200 (2017).

Freiberger C. et al., Long-term prognostic significance of rising PSA levels following radiotherapy for localized prostate cancer—focus on overall survival. *Radiation oncology* (London, England) 12, 98 (2017).

Gaertner F. C. et al., Uptake of PSMA-ligands in normal tissues is dependent on tumor load in patients with prostate cancer. *Oncotarget* 8, 55094-55103 (2017).

Haberkorn U, Eder M, Kopka K, Babich J W, Eisenhut M. New Strategies in Prostate Cancer: Prostate-Specific Membrane Antigen (PSMA) Ligands for Diagnosis and Therapy. Clin Cancer Res 2016; 22:9-15.

Haberkorn U., F. Giesel, A. Morgenstern, C. Kratochwil, The Future of Radioligand Therapy: alpha, beta, or Both? *Journal of nuclear medicine: official publication, Society of Nuclear Medicine* 58, 1017-1018 (2017).

Halabi S. et al., Updated prognostic model for predicting overall survival in first-line chemotherapy for patients with metastatic castration-resistant prostate cancer. *Journal of clinical oncology: official journal of the American Society of Clinical Oncology* 32, 671-677 (2014).

Han M. et al., Biochemical (prostate specific antigen) recurrence probability following radical prostatectomy for clinically localized prostate cancer. *The Journal of urology* 169, 517-523 (2003).

Hofman M. S. et al., Lutetium-177 PSMA (LuPSMA) theranostics phase II trial:
efficacy, safety and QoL in patients with castrate-resistant prostate cancer treated with LuPSMA. *Annals of Oncology* 28, Suppl 5 (2017).

Hohberg M. et al., Lacrimal Glands May Represent Organs at Risk for Radionuclide Therapy of Prostate Cancer with [(177)Lu]DKFZ-PSMA-617. *Molecular imaging and biology:MIB:the official publication of the Academy of Molecular Imaging* 18, 437-445 (2016).

I. Endocyte. (2018).

Israeli R. S., C. T. Powell, J. G. Corr, W. R. Fair, W. D. Heston, Expression of the prostate-specific membrane antigen. *Cancer research* 54, 1807-1811 (1994).

Kabasakal L. et al., Lu-177-PSMA-617 Prostate-Specific Membrane Antigen Inhibitor Therapy in Patients with Castration-Resistant Prostate Cancer: Stability, Bio-distribution and Dosimetry. *Molecular imaging and radionuclide therapy* 26, 62-68 (2017).

Kabasakal L. et al., Pre-therapeutic dosimetry of normal organs and tissues of (177)Lu-PSMA-617 prostate-specific membrane antigen (PSMA) inhibitor in patients with castration-resistant prostate cancer. *European journal of nuclear medicine and molecular imaging* 42, 1976-1983 (2015).

Kantoff P. W. et al., Sipuleucel-T immunotherapy for castration-resistant prostate cancer. *The New England journal of medicine* 363, 411-422 (2010).

Kasperzyk J L, Finn S P, Flavin R, et al. Prostate-specific membrane antigen protein expression in tumor tissue and risk of lethal prostate cancer. Cancer Epidemiol Biomarkers Prev 2013; 22:2354-63.

Kiess A. P. et al., (2S)-2-(3-(1-Carboxy-5-(4-211At-Astato-benzamido)Pentyl)Ureido)-Pentanedioic Acid for PSMA-Targeted alpha-Particle Radiopharmaceutical Therapy. *Journal of nuclear medicine: official publication, Society of Nuclear Medicine* 57, 1569-1575 (2016).

Klein Nulent T. J. W. et al., Physiologic distribution of PSMA-ligand in salivary glands and seromucous glands of the head and neck on PET/CT. *Oral surgery, oral medicine, oral pathology and oral radiology*, (2018).

Kopka K., M. Benesova, C. Barinka, U. Haberkorn, J. Babich, Glu-Ureido-Based Inhibitors of Prostate-Specific Membrane Antigen: Lessons Learned During the Development of a Novel Class of Low-Molecular-Weight Theranostic Radiotracers. *Journal of nuclear medicine: official publication, Society of Nuclear Medicine* 58, 17s-26s (2017).

Kratochwil C. et al., PMPA for nephroprotection in PSMA-targeted radionuclide therapy of prostate cancer. *Journal of nuclear medicine: official publication, Society of Nuclear Medicine* 56, 293-298 (2015).

Kratochwil C. et al., PSMA-Targeted Radionuclide Therapy of Metastatic Castration-Resistant Prostate Cancer with 177Lu-Labeled PSMA-617. *Journal of nuclear medicine: official publication, Society of Nuclear Medicine* 57, 1170-1176 (2016).

Kratochwil C. et al., Targeted Alpha Therapy of mCRPC with (225)Actinium-PSMA-617: Swimmer-Plot analysis suggests efficacy regarding duration of tumor-control. *Journal of nuclear medicine: official publication, Society of Nuclear Medicine*, (2018).

Kratochwil C. et al., Targeted Alpha Therapy of mCRPC with 225Actinium-PSMA-617: Dosimetry estimate and empirical dose finding. *Journal of nuclear medicine: official publication, Society of Nuclear Medicine*, (2017).

Kratochwil C. et al., Targeted alpha therapy of mCRPC: Dosimetry estimate of (213)Bismuth-PSMA-617. *European journal of nuclear medicine and molecular imaging* 45, 31-37 (2018).

Kratochwil C. et al., Targeted alpha-Therapy of Metastatic Castration-Resistant Prostate Cancer with (225)Ac-PSMA-617: Dosimetry Estimate and Empiric Dose Finding. *Journal of nuclear medicine: official publication, Society of Nuclear Medicine* 58, 1624-1631 (2017).

Kratochwil C., A. Afshar-Oromieh, K. Kopka, U. Haberkorn, F. L. Giesel, Current Status of Prostate-Specific Membrane Antigen Targeting in Nuclear Medicine: Clinical Translation of Chelator Containing Prostate-Specific Membrane Antigen Ligands Into Diagnostics and Therapy for Prostate Cancer. *Seminars in nuclear medicine* 46, 405-418 (2016).

Kwekkeboom D., Perspective on 177Lu-PSMA Therapy for Metastatic Castration-Resistant Prostate Cancer. *Journal of nuclear medicine: official publication, Society of Nuclear Medicine* 57, 1002-1003 (2016).

Liu H. et al., Constitutive and antibody-induced internalization of prostate-specific membrane antigen. *Cancer research* 58, 4055-4060 (1998).

Lutje S. et al., PSMA Ligands for Radionuclide Imaging and Therapy of Prostate Cancer: Clinical Status. *Theranostics* 5, 1388-1401 (2015).

Majer P. et al., Discovery of Orally Available Prodrugs of the Glutamate Carboxypeptidase II (GCPII) Inhibitor 2-Phosphonomethylpentanedioic Acid (2-PMPA). *Journal of medicinal chemistry* 59, 2810-2819 (2016).

Maurer T., M. Eiber, M. Schwaiger, J. E. Gschwend, Current use of PSMA-PET in prostate cancer management. *Nature reviews. Urology* 13, 226-235 (2016).

Moreira D. M. et al., Predicting Time From Metastasis to Overall Survival in Castration-Resistant Prostate Cancer: Results From SEARCH. *Clinical genitourinary cancer* 15, 60-66.e62 (2017).

Morris M. J. et al., Radiographic progression-free survival as a response biomarker in metastatic castration-resistant prostate cancer: COU-AA-302 results. *Journal of clinical oncology: official journal of the American Society of Clinical Oncology* 33, 1356-1363 (2015).

Nedelcovych M. et al., Enhanced Brain Delivery of 2-(Phosphonomethyl)pentanedioic Acid Following Intranasal Administration of Its gamma-Substituted Ester Prodrugs. *Molecular pharmaceutics* 14, 3248-3257 (2017).

O'Keefe D. S., D. J. Bacich, W. D. Heston, Comparative analysis of prostate-specific membrane antigen (PSMA) versus a prostate-specific membrane antigen-like gene. *The Prostate* 58, 200-210 (2004).

Omlin A. et al., Improved survival in a cohort of trial participants with metastatic castration-resistant prostate cancer demonstrates the need for updated prognostic nomograms. *European urology* 64, 300-306 (2013).

Parker C. et al., Alpha emitter radium-223 and survival in metastatic prostate cancer. *The New England journal of medicine* 369, 213-223 (2013).

Pemer S, Hofer M D, Kim R, et al. Prostate-specific membrane antigen expression as a predictor of prostate cancer progression. Hum Pathol 2007; 38:696-701.

Petrylak D. P. et al., Docetaxel and estramustine compared with mitoxantrone and prednisone for advanced refractory prostate cancer. *The New England journal of medicine* 351, 1513-1520 (2004).

Pillai M R, Nanabala R, Joy A, Sasikumar A, Russ Knapp F F. Radiolabeled enzyme inhibitors and binding agents targeting PSMA: Effective theranostic tools for imaging and therapy of prostate cancer. Nucl Med Biol 2016; 43:692-720.

Rahbar K. et al., German Multicenter Study Investigating 177Lu-PSMA-617 Radioligand Therapy in Advanced Prostate Cancer Patients. *Journal of nuclear medicine: official publication, Society of Nuclear Medicine* 58, 85-90 (2017).

Rahbar K., H. Ahmadzadehfar, M. Boegemann, (177)Lu-PSMA-617 radioligand therapy in mCRPC: ready for phase III trial? *European journal of nuclear medicine and molecular imaging* 45, 513-514 (2018).

Ramadan W. H., W. K. Kabbara, H. S. Al Basiouni Al Masri, Enzalutamide for patients with metastatic castration-resistant prostate cancer. *OncoTargets and therapy* 8, 871-876 (2015).

Ristau B. T., D. S. O'Keefe, D. J. Bacich, The prostate-specific membrane antigen: lessons and current clinical implications from 20 years of research. *Urologic oncology* 32, 272-279 (2014).

Saad F. et al., The 2015 CUA-CUOG Guidelines for the management of castration-resistant prostate cancer (CRPC). *Canadian Urological Association journal=Journal de l'Association des urologues du Canada* 9, 90-96 (2015).

Scarpa L. et al., The (68)Ga/(177)Lu theragnostic concept in PSMA targeting of castration-resistant prostate cancer: correlation of SUVmax values and absorbed dose estimates. *European journal of nuclear medicine and molecular imaging* 44, 788-800 (2017).

Schwarzenboeck S. M. et al., PSMA Ligands for PET Imaging of Prostate Cancer. *Journal of nuclear medicine: official publication, Society of Nuclear Medicine* 58, 1545-1552 (2017).

Silver D. A., I. Pellicer, W. R. Fair, W. D. Heston, C. Cordon-Cardo, Prostate-specific membrane antigen expression in normal and malignant human tissues. *Clinical cancer research: an official journal of the American Association for Cancer Research* 3, 81-85 (1997).

Taieb D. et al., PSMA-Targeted Radionuclide Therapy and salivary gland toxicity: why does it matter? *Journal of nuclear medicine: official publication, Society of Nuclear Medicine*, (2018).

Torre L. A. et al., Global cancer statistics, 2012. *CA: a cancer journal for clinicians* 65, 87-108 (2015).

Valkema R. et al., Long-term follow-up of renal function after peptide receptor radiation therapy with (90)Y-DOTA (0),Tyr(3)-octreotide and (177)Lu-DOTA(0), Tyr(3)-octreotate. *Journal of nuclear medicine: official publication, Society of Nuclear Medicine* 46 Suppl 1, 83s-91s (2005).

Virgolini I., C. Decristoforo, A. Haug, S. Fanti, C. Uprimny, Current status of theranostics in prostate cancer. *European journal of nuclear medicine and molecular imaging*, (2017).

Virgolini I., C. Decristoforo, A. Haug, S. Fanti, C. Uprimny, Current status of theranostics in prostate cancer. *European journal of nuclear medicine and molecular imaging* 45, 471-495 (2018).

von Eyben F. E. et al., Third-line treatment and (177)Lu-PSMA radioligand therapy of metastatic castration-resistant prostate cancer: a systematic review. *European journal of nuclear medicine and molecular imaging*, (2017).

Yadav M. P. et al., Post-therapeutic dosimetry of 177Lu-DKFZ-PSMA-617 in the treatment of patients with metastatic castration-resistant prostate cancer. *Nuclear medicine communications* 38, 91-98 (2017).

Yordanova A. et al., The impact of repeated cycles of radioligand therapy using [(177)Lu]Lu-PSMA-617 on renal function in patients with hormone refractory metastatic prostate cancer. *European journal of nuclear medicine and molecular imaging* 44, 1473-1479 (2017).

Zechmann C. M. et al., Radiation dosimetry and first therapy results with a (124)I/(131)I-labeled small molecule (MIP-1095) targeting PSMA for prostate cancer therapy. *European journal of nuclear medicine and molecular imaging* 41, 1280-1292 (2014).

Zumsteg Z. S. et al., The natural history and predictors of outcome following biochemical relapse in the dose escalation era for prostate cancer patients undergoing definitive external beam radiotherapy. *European urology* 67, 1009-1016 (2015).

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A method for preventing or reducing uptake of a prostate-specific membrane antigen (PSMA)-targeted imaging or therapeutic agent in an organ selected from a kidney, a salivary gland, and a lacrimal gland, while sparing tumor uptake, the method comprising administering to a subject being treated with a PSMA-targeted agent a prodrug of 2-(phosphonomethyl) pentanedioic acid (2-PMPA) in an amount effective to prevent or reduce uptake of the PSMA-targeted agent in the organ selected from a kidney, a salivary gland, and a lacrimal glan, wherein the prodrug of 2-PMPA is:

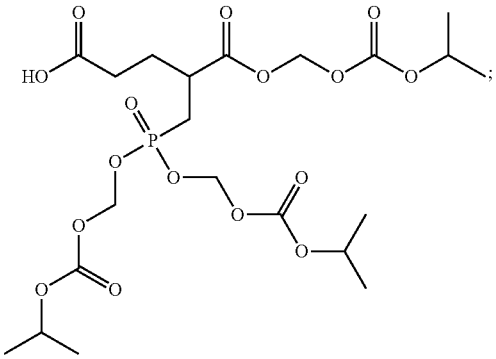 [SMILES: CC(C)OC(=O)OCOC(=O)C(CCC(=O)O)CP(=O)(OCOC(=O)OC(C)C)OCOC(=O)OC(C)C]

and
pharmaceutically acceptable salts thereof;
wherein the prodrug of 2-PMPA is administered to the subject before the PSMA-targeted imaging or therapeutic agent is administered; or
wherein the prodrug of 2-PMPA is administered to the subject simultaneously with the PSMA-targeted imaging or therapeutic agent;
wherein the PSMA-targeted imaging or therapeutic agent has a PSMA-binding moiety selected from a glycine-ureido-lysine motif having the following chemical structure:

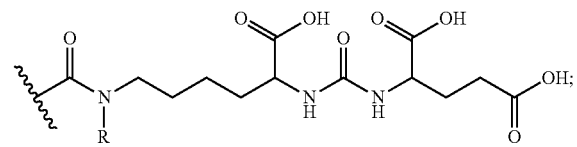

wherein R is H or brominated benzyl; or
a phosphoramidate motif having the following chemical structure:

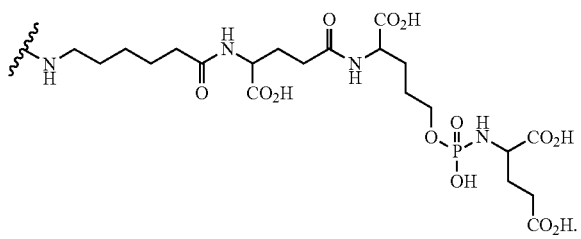 [SMILES: *NCCCCCC(=O)NC(CCC(=O)NC(CCCOP(=O)(O)NC(CCC(=O)O)C(=O)O)C(=O)O)C(=O)O]

2. The method of claim 1, wherein the PSMA-targeted imaging or therapeutic agent is selected from the group consisting of 177Lu-PSMA-617, 131I-MIP-1095, 177Lu-PSMA-I&T, 177Lu-PSMA-R2, 225Ac-PSMA-617, CTT1403, CTT1700, 68Ga-PSMA-11, 18F-DCFPyL, CTT1057, 68Ga-PSMA-R2, and 68Ga-PSMA-617.

3. The method of claim 2, wherein the PSMA-targeted therapeutic agent is a radiotherapeutic administered in a cumulative amount from about 3 GBq to about 100 GBq.

4. The method of claim 3, wherein the PSMA-targeted radiotherapeutic is administered in a cumulative amount from about 52 GBq to about 100 GBq.

5. The method of claim 2, wherein the PSMA-targeted therapeutic agent and 2-PMPA prodrug are administered for about 1 to about 15 treatment cycles.

6. The method of claim 5, wherein the PSMA-targeted therapeutic and 2-PMPA prodrug are administered for about 6 to about 15 treatment cycles.

7. The method of claim 1, wherein the prodrug of 2-PMPA is administered to the subject before the PSMA-targeted imaging or therapeutic agent is administered.

8. The method of claim 1, wherein the prodrug of 2-PMPA is administered to the subject simultaneously with the PSMA-targeted imaging or therapeutic agent.

9. The method of claim 1, wherein the organ is a kidney.

10. The method of claim 1, wherein the organ is a lacrimal gland.

11. The method of claim 1, wherein the organ is a salivary gland.

12. The method of claim 1, wherein the PSMA-targeted imaging or therapeutic agent has a PSMA-binding moiety having a glycine-ureido-lysine motif having the following chemical structure:

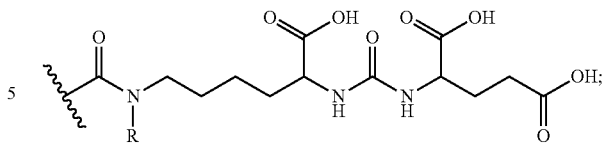

wherein R is H or brominated benzyl.

13. The method of claim 12, wherein the PSMA-targeted imaging or therapeutic agent is selected from $^{177}$Lu-PSMA-617, $^{131}$I-MIP-1095, $^{177}$Lu-PSMA-I&T, $^{177}$Lu-PSMA-R2, $^{225}$Ac-PSMA-617, $^{68}$Ga-PSMA-11, $^{18}$F-DCFPyL, $^{68}$Ga-PSMA-R2, and $^{68}$Ga-PSMA-617.

14. The method of claim 1, wherein the PSMA-targeted imaging or therapeutic agent has a PSMA-binding moiety having a phosphoramidate motif having the following chemical structure:

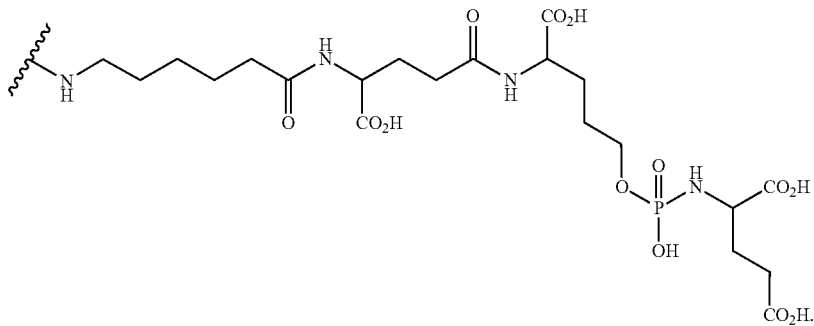 [SMILES: *NCCCCCC(=O)NC(CCC(=O)NC(CCCOP(=O)(O)NC(CCC(=O)O)C(=O)O)C(=O)O)C(=O)O]

15. The method of claim 14, wherein the PSMA-targeted imaging or therapeutic agent is selected from CTT1403, CTT1700, and CTT1057.

* * * * *